(12) United States Patent
Pangborn et al.

(10) Patent No.: US 9,065,860 B2
(45) Date of Patent: Jun. 23, 2015

(54) METHOD AND APPARATUS FOR MULTIPLE ACCESS OF PLURAL MEMORY BANKS

(75) Inventors: Jeffrey A. Pangborn, Saratoga, CA (US); Gregg A. Bouchard, Georgetown, TX (US); Rajan Goyal, Saratoga, CA (US); Najeeb I. Ansari, San Jose, CA (US); Ahmed Shahid, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 195 days.

(21) Appl. No.: 13/565,735

(22) Filed: Aug. 2, 2012

(65) Prior Publication Data

US 2013/0067173 A1    Mar. 14, 2013

Related U.S. Application Data

(60) Provisional application No. 61/514,344, filed on Aug. 2, 2011, provisional application No. 61/514,382, filed

(51) Int. Cl.
| | | |
|---|---|---|
| G06F 12/00 | (2006.01) |
| H04L 29/06 | (2006.01) |
| G06F 13/16 | (2006.01) |
| G06F 12/08 | (2006.01) |
| G06F 12/02 | (2006.01) |
| G06F 12/04 | (2006.01) |
| G06F 12/06 | (2006.01) |
| G06N 5/02 | (2006.01) |
| H04L 12/26 | (2006.01) |
| H04L 12/747 | (2013.01) |
| H04L 12/851 | (2013.01) |
| H04L 12/801 | (2013.01) |
| H04L 12/741 | (2013.01) |
| G06F 9/50 | (2006.01) |
| H04L 29/08 | (2006.01) |
| G06F 9/46 | (2006.01) |

(52) U.S. Cl.
CPC .............. *H04L 69/22* (2013.01); *G06F 13/16* (2013.01); *G06F 12/0802* (2013.01); *G06F 12/0207* (2013.01); *G06F 12/04* (2013.01); *G06F 12/0623* (2013.01); *G06F 13/1642* (2013.01); *G06F 12/00* (2013.01); *G06F 12/06* (2013.01); *G06N 5/02* (2013.01); *H04L 43/18* (2013.01); *H04L 63/0227* (2013.01); *H04L 45/742* (2013.01); *H04L 47/2441* (2013.01); *H04L 47/39* (2013.01); *H04L 45/745* (2013.01); *G06F 9/5027* (2013.01); *H04L 67/10* (2013.01); *G06F 9/46* (2013.01); *Y02B 60/142* (2013.01); *G06F 9/5016* (2013.01)

(58) Field of Classification Search
None
See application file for complete search history.

(56) References Cited

U.S. PATENT DOCUMENTS

| 4,930,066 | A | * | 5/1990 | Yokota ........................... 711/149 |
| 7,464,218 | B2 | * | 12/2008 | Thiessen et al. ............... 711/112 |
| 2013/0036274 | A1 | | 2/2013 | Bouchard et al. |

*Primary Examiner* — Midys Rojas

(74) *Attorney, Agent, or Firm* — Hamilton, Brook, Smith & Reynolds, P.C.

(57) ABSTRACT

A processor with on-chip memory including a plurality of physical memory banks is disclosed. The processor includes a method, and corresponding apparatus, of enabling multi-access to the plurality of physical memory banks. The method comprises selecting a subset of multiple access requests to be executed in at least one clock cycle over at least one of a number of access ports connected to the plurality of physical memory banks, the selected subset of access requests addressed to different physical memory banks, among the plurality of memory banks, and scheduling the selected subset of access requests, each over a separate access port.

36 Claims, 20 Drawing Sheets

Related U.S. Application Data on Aug. 2, 2011, provisional application No. 61/514,379, filed on Aug. 2, 2011, provisional application No. 61/514,400, filed on Aug. 2, 2011, provisional application No. 61/514,406, filed on Aug. 2, 2011, provisional application No. 61/514,407, filed on Aug. 2, 2011, provisional application No. 61/514,438, filed on Aug. 2, 2011, provisional application No. 61/514,447, filed on Aug. 2, 2011, provisional application No. 61/514,450, filed on Aug. 2, 2011, provisional application No. 61/514,459, filed on Aug. 2, 2011, provisional application No. 61/514,463, filed on Aug. 2, 2011.

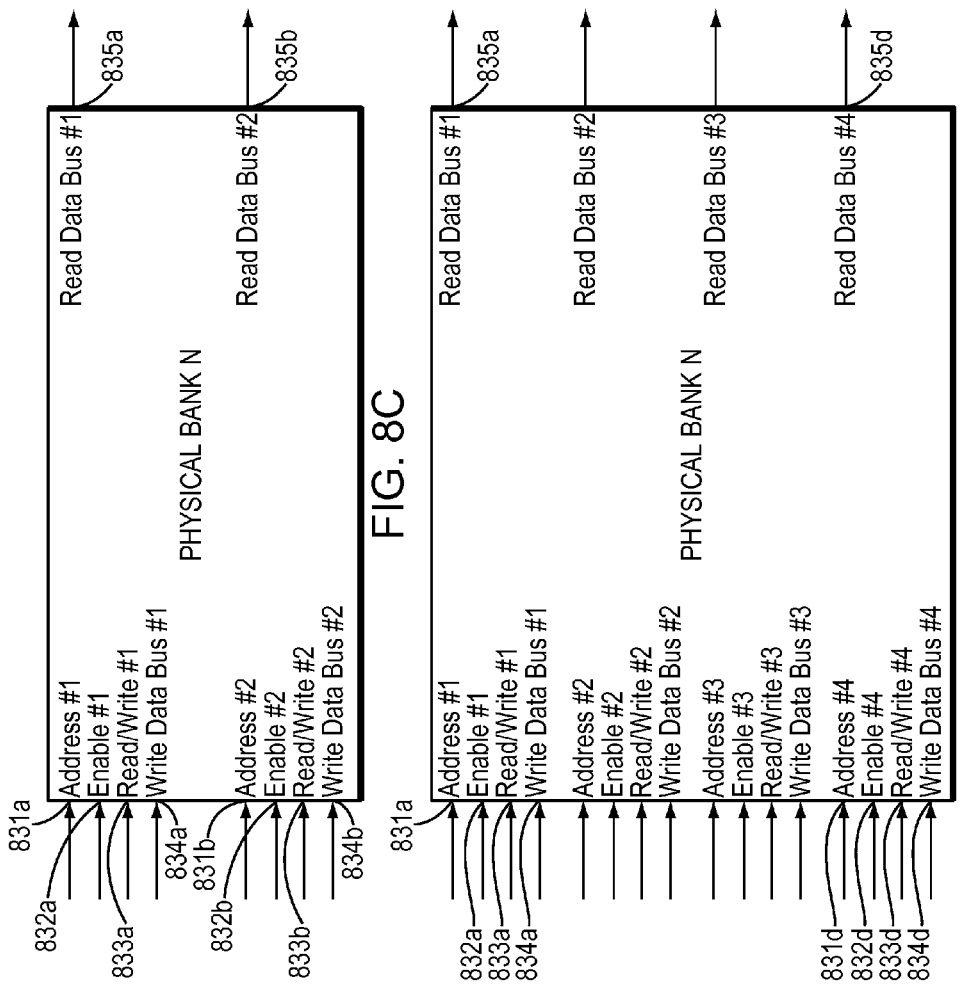

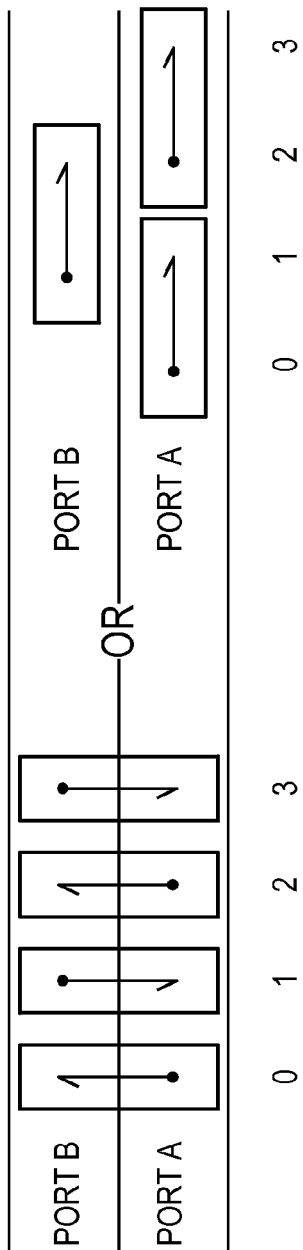
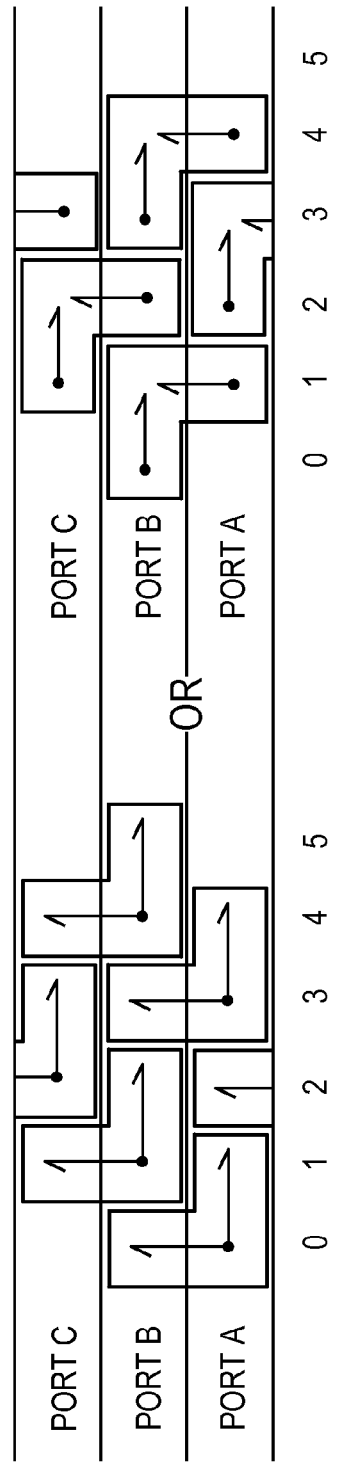
FIG. 11A
FIG. 11B
FIG. 11C
FIG. 11D

US 9,065,860 B2

METHOD AND APPARATUS FOR MULTIPLE ACCESS OF PLURAL MEMORY BANKS

RELATED APPLICATIONS

This application claims the benefit of U.S. Provisional Application No. 61/514,344, filed on Aug. 2, 2011; U.S. Provisional Application No. 61/514,382, filed on Aug. 2, 2011; U.S. Provisional Application No. 61/514,379, filed on Aug. 2, 2011; U.S. Provisional Application No. 61/514,400, filed on Aug. 2, 2011; U.S. Provisional Application No. 61/514,406, filed on Aug. 2, 2011; U.S. Provisional Application No. 61/514,407, filed on Aug. 2, 2011; U.S. Provisional Application No. 61/514,438, filed on Aug. 2, 2011; U.S. Provisional Application No. 61/514,447, filed on Aug. 2, 2011; U.S. Provisional Application No. 61/514,450, filed on Aug. 2, 2011; U.S. Provisional Application No. 61/514,459, filed on Aug. 2, 2011; and U.S. Provisional Application No. 61/514,463, filed on Aug. 2, 2011. The entire teachings of the above applications are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

According to at least one example embodiment, a method of enabling multi-access to a plurality of physical memory banks comprises selecting a subset of multiple access requests to be executed in at least one clock cycle over at least one of a number of access ports connected to the plurality of physical memory banks, the selected subset of access requests addressed to different physical memory banks, among the plurality of memory banks; and scheduling the selected subset of access requests, each over a separate access port.

According to at least one other example embodiment, an apparatus of enabling multi-access to a plurality of physical memory banks comprises at least one memory buffer configured to store multiple access requests received from one or more processors and a scheduling module configured to select a subset of the multiple access requests to be executed in at least one clock cycle over at least one of a number of access ports connected to the plurality of physical memory banks, the selected subset of access requests addressed to different physical memory banks, among the plurality of memory banks, and schedule the selected subset of access requests, each over a separate access port.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 8A-8D show different types of physical memory banks.

FIGS. 11A-11D show graphical representations of different approaches of scheduling access requests with less than four access requests being scheduled per clock cycle.

DETAILED DESCRIPTION

Figure 1:
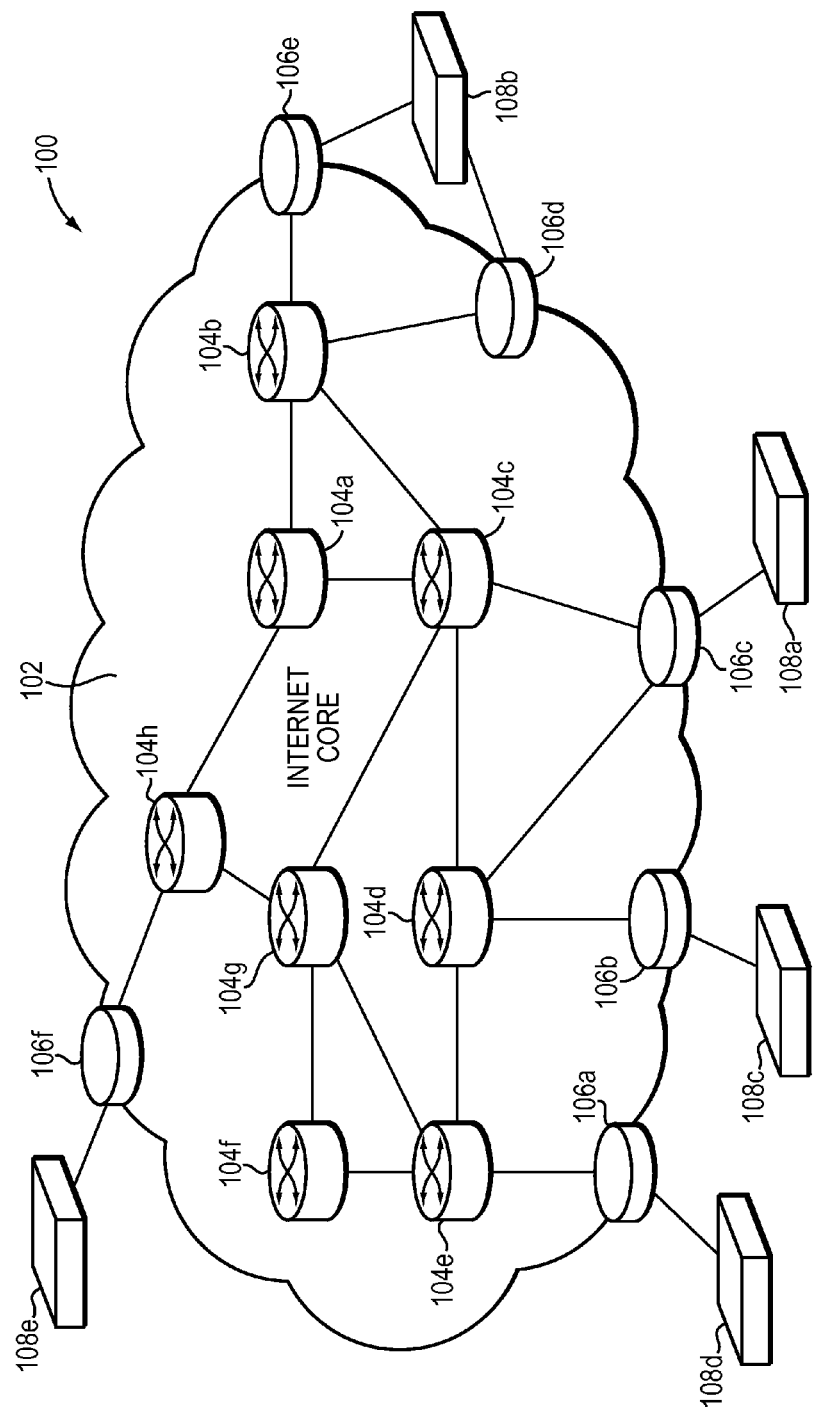
FIG. 1 is a block diagram of a typical network topology including network elements where a search processor may be employed.

A description of example embodiments of the invention follows.

Although packet classification has been widely studied for a long time, researchers are still motivated to seek novel and efficient packet classification solutions due to: i) the continued growth of network bandwidth, ii) increasing complexity of network applications, and iii) technology innovations of network systems.

Explosion in demand for network bandwidth is generally due to the growth in data traffic. Leading service providers report bandwidths doubling on their backbone networks about every six to nine months. As a consequence, novel packet classification solutions are required to handle the exponentially increasing traffics on both edge and core devices.

Complexity of network applications is increasing due to the increasing number of network applications being implemented in network devices. Packet classification is widely used for various kinds of applications, such as service-aware routing, intrusion prevention and traffic shaping. Therefore, novel solutions of packet classification must be intelligent to handle diverse types of rule sets without significant loss of performance.

In addition, new technologies, such as multi-core processors provide unprecedented computing power, as well as highly integrated resources. Thus, novel packet classification solutions must be well suited to advanced hardware and software technologies.

Existing packet classification algorithms trade memory for time. Although the tradeoffs have been constantly improving, the time taken for a reasonable amount of memory is still generally poor.

Because of problems with existing algorithmic schemes, designers use ternary content-addressable memory (TCAM), which uses brute-force parallel hardware to simultaneously check packets against all rules. The main advantages of TCAMs over algorithmic solutions are speed and determinism. TCAMs work for all databases.

A TCAM is a hardware device that functions as a fully associative memory. A TCAM cell stores three values: 0, 1, or 'X,' which represents a don't-care bit and operates as a per-cell mask enabling the TCAM to match rules containing wildcards, such as a kleene star '*'. In operation, a whole packet header can be presented to a TCAM to determine which entry, or rule, it matches. However, the complexity of TCAMs has allowed only small, inflexible, and relatively slow implementations that consume a lot of power. Therefore, a need continues for efficient algorithmic solutions operating on specialized data structures.

Current algorithmic methods remain in the stages of mathematical analysis and/or software simulation, that is observation based solutions.

Proposed mathematic solutions have been reported to have excellent time/spacial complexity. However, methods of this kind have not been found to have any implementation in real-life network devices because mathematical solutions often add special conditions to simplify a problem and/or omit large constant factors which might conceal an explicit worst-case bound.

Proposed observation based solutions employ statistical characteristics observed in rules to achieve efficient solution for real-life applications. However, these algorithmic methods generally only work well with a specific type of rule sets. Because packet classification rules for different applications have diverse features, few observation based methods are able to fully exploit redundancy in different types of rule sets to obtain stable performance under various conditions.

Packet classification is performed using a packet classifier, also called a policy database, flow classifier, or simply a classifier. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to according to criteria on 'F' fields of the packet header and associates an identifier, e.g., class ID, with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier determines the rules relative priority. In other words, a packet that matched multiple rules belongs to the class identified by the identifier, class ID, of the rule among them that appears first in the classifier.

Packet classifiers may analyze and categorize rules in a classifier table and create a decision tree that is used to match received packets with rules from the classifier table. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Decision trees may be used to match a received packet with a rule in a classifier table to determine how to process the received packet.

In simple terms, the problem may be defined as finding one or more rules, e.g., matching rules, that match a packet. Before describing a solution to this problem, it should be noted that a packet may be broken down into parts, such as a header, payload, and trailer. The header of the packet, or packet header, may be further broken down into fields, for example. So, the problem may be further defined as finding one or more rules that match one or more parts of the packet.

A possible solution to the foregoing problem(s) may be described, conceptually, by describing how a request to find one or more rules matching a packet or parts of the packet, a "lookup request," leads to finding one or more matching rules.

FIG. 1 is a block diagram 100 of a typical network topology including network elements where a search processor may be employed. The network topology includes an Internet core 102 including a plurality of core routers 104a-h. Each of the plurality of core routers 104a-h is connected to at least one other of the plurality of core routers 104a-h. Core routers 104a-h that are on the edge of the Internet core 102, e.g., core routers 104b-e and 104h, are coupled with at least one edge router 106a-f. Each edge router 106a-f is coupled to at least one access router 108a-e.

The core routers 104a-104h are configured to operate in the Internet core 102 or Internet backbone. The core routers 104a-104h are configured to support multiple telecommunications interfaces of the Internet core 102 and are further configured to forward packets at a full speed of each of the multiple telecommunications protocols.

The edge routers 106a-106f are placed at the edge of the Internet core 102. Edge routers 106a-106f bridge access routers 108a-108e outside the Internet core 102 and core routers 104a-104h in the Internet core 102. Edge routers 106a-106f may be configured to employ a bridging protocol to forward packets from access routers 108a-108e to core routers 104a-104h and vice versa.

The access routers 108a-108e may be routers used by an end user, such as a home user or an office, to connect to one of the edge routers 106a-106f, which in turn connects to the Internet core 102 by connecting to one of the core routers 104a-104h. In this manner, the edge routers 106a-106f may connect to any other edge router 106a-104f via the edge routers 106a-104f and the interconnected core routers 104a-104h.

The search processor described herein may reside in any of the core routers 104a-104h, edge routers 106a-106f, or access routers 108a-108e. The search processor described herein, within each of these routers, is configured to analyze Internet protocol (IP) packets based on a set of rules and forward the IP packets along an appropriate network path.

Figure 2A:
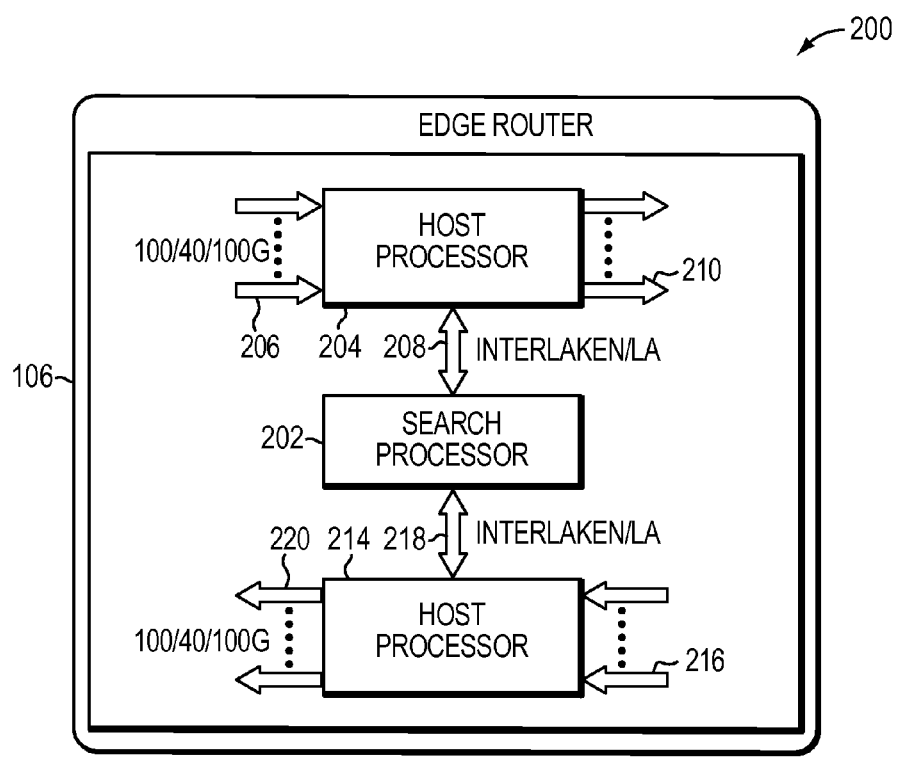
FIGS. 2A-2C show block diagrams illustrating example embodiments of routers employing a search processor.

FIG. 2A is a block diagram 200 illustrating an example embodiment of an edge router 106 employing a search processor 202. An edge router 106, such as a service provider edge router, includes the search processor 202, a first host processor 204 and a second host processor 214. Examples of the first host processor include processors such as a network processor unit (NPU), a custom application-specific integrated circuit (ASIC), an OCTEON® processor available from Cavium Inc., or the like. The first host processor 204 is configured as an ingress host processor. The first host processor 204 receives ingress packets 206 from a network. Upon receiving a packet, the first host processor 204 forwards a lookup request including a packet header, or field, from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. Examples of the second host processor include processors such as a NPU, a custom ASIC, an OCTEON processor, or the like. The second host processor 214 receives egress packets 216 to send to the network. The second host processor 214 forwards a lookup request with a packet header, or field, from the egress packets 216 to the search processor 202 over a second Interlaken interface 218. The search processor 202 then processes the packet header using a plurality of rule processing engines employing a plurality of rules to determine a path to forward the packets on the network. The search processor 202 forwards the processed ingress packets 220 from the host processor 214 to another network element in the network.

Figure 2B:
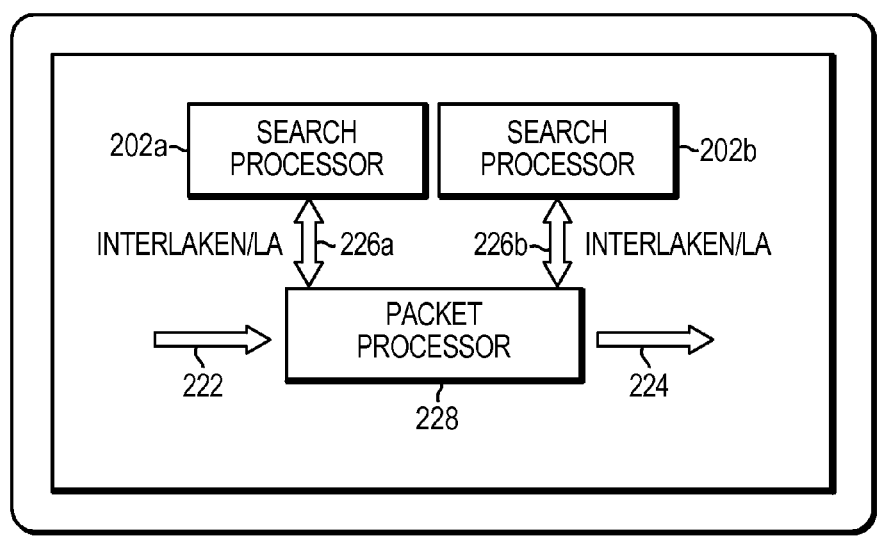

FIG. 2B is a block diagram 220 illustrating another example embodiment of an edge router 106 configured to employ the search processor 202. In this embodiment, the edge router 106 includes a plurality of search processors 202, for example, a first search processor 202a and a second search processor 202b. The plurality of search processors 202a-202b are coupled to a packet processor 228 using a plurality of Interlaken interfaces 226a-b, respectively. Examples of the packet processor 228 include processors such as NPU, ASIC, or the like. The plurality of search processors 202a-202b may be coupled to the packet processor 228 over a single Interlaken interface. The edge router 106 receives a lookup request with a packet header, or fields, of pre-processed packets 222 at the packet processor 228. The packet processor 228 sends the lookup request to one of the search processors 202a-202b. The search processor, 202a or 202b, searches a packet header for an appropriate forwarding destination for the pre-processed packets 222 based on a set of rules and data within the packet header, and responds to the lookup request to the packet processor 228. The packet processor 228 then sends the post processed packets 224 to the network based on the response to the lookup request from the search processors 202a-202b.

Figure 2C:
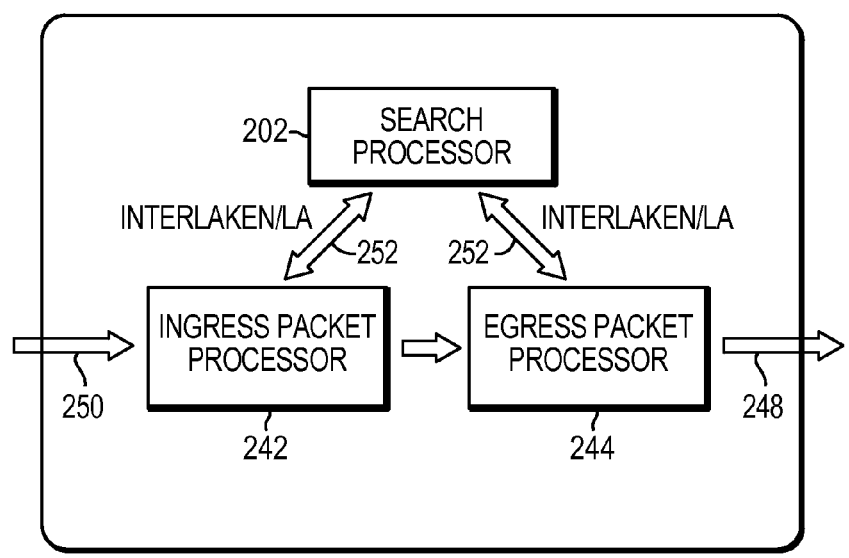

FIG. 2C is a block diagram 240 illustrating an example embodiment of an access router employing the search processor 202. The access router receives an input packet 250 at an ingress packet processor 242. Examples of the ingress packet processor 242 include OCTEON processor, or the like. The ingress packet processor 242 then forwards a lookup request with a packet header of the input packet 250 to the search processor 202. The search processor 202 determines, based on packet header of the lookup request, a forwarding path for the input packet 250 and responds to the lookup requests over the Interlaken interface 252 to the egress packet processor 244. The egress packet processor 244 then outputs the forwarded packet 248 to the network.

Figure 3:
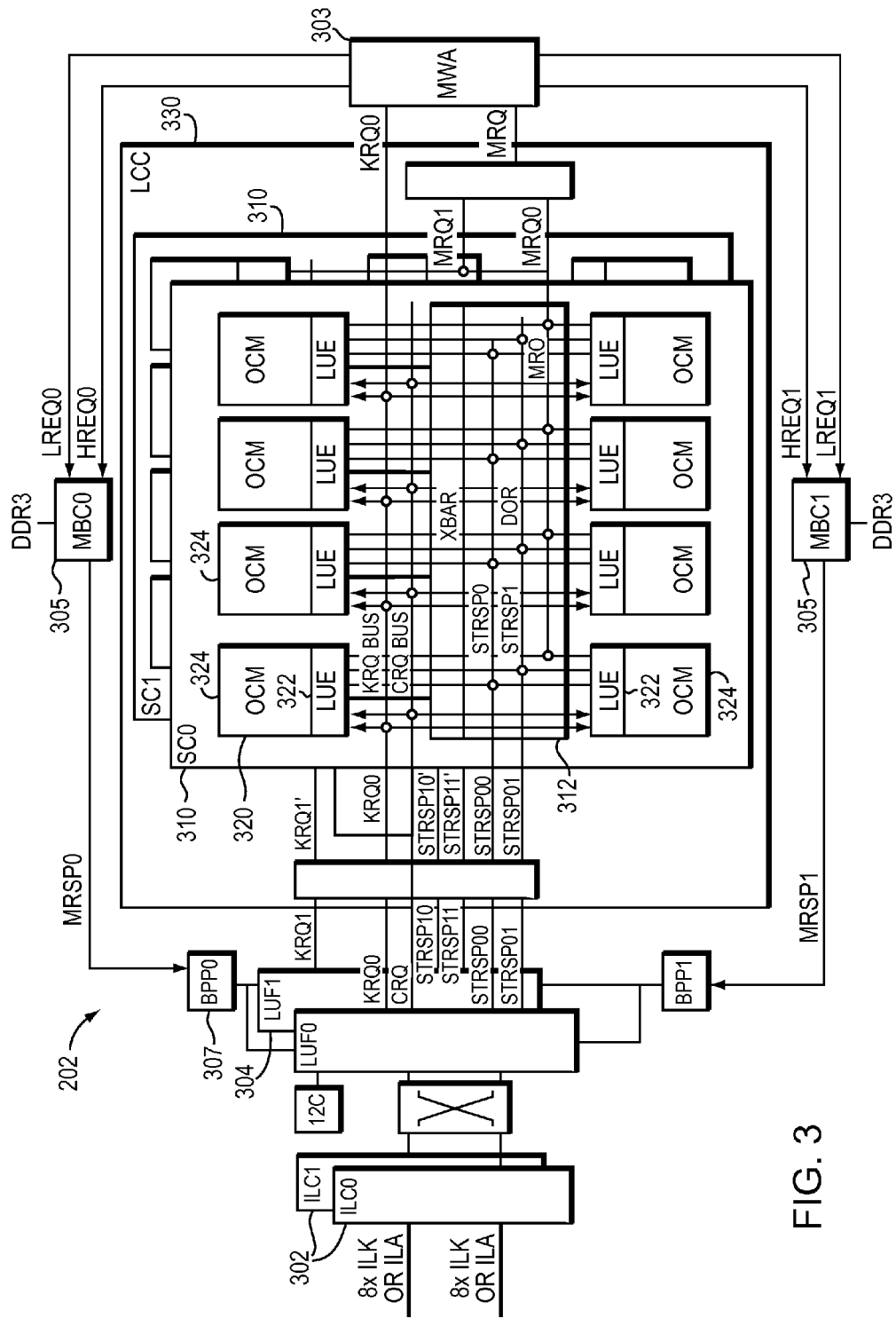
FIG. 3 shows example architecture of a search processor.

FIG. 3 shows an example architecture of a search processor 202. The processor includes, among other things, an interface, e.g., Interlaken LA interface, 302 to receive requests from a host processor, e.g., 204, 214, 228, 242, or 244, and to send responses to the host processor. The interface 302 is coupled to Lookup Front-end (LUF) processors 304 configured to process, schedule, and order the requests and responses communicated from or to the interface 302. According to an example embodiment, each of the LUF processors is coupled to one of the super clusters 310. Each super cluster 310 includes one or more memory clusters, or search clusters, 320. Each of the memory, or search, clusters 320 includes a Lookup Engine (LUE) component 322 and a corresponding on-chip memory (OCM) component 324. A memory, or search, cluster may be viewed as a search block including a LUE component 322 and a corresponding OCM component 324. Each LUE component 322 is associated with a corresponding OCM component 324. A LUE component 322 includes processing engines configured to search for rules in a corresponding OCM component 324, given a request, that match keys for packet classification. The LUE component 322 may also include interface logic, or engine(s), configured to manage transport of data between different components within the memory cluster 320 and communications with other clusters. The memory clusters 320, in a given super cluster 310, are coupled through an interface device, e.g., crossbar (XBAR), 312. The XBAR 312 may be viewed as an intelligent fabric enabling coupling LUF processors 304 to different memory clusters 320 as well as coupling between different memory clusters 320 in the same super cluster 310. The search processor 202 may include one or more super clusters 310. A lookup cluster complex (LCC) 330 defines the group of super clusters 310 in the search processor 202.

The search processor 202 may also include a memory walker aggregator (MWA) 303 and at least one memory block controller (MBC) 305 to coordinate read and write operations from/to memory located external to the processor. The search processor 202 may further include one or more Bucket Post Processors (BPPs) 307 to search rules, which are stored in memory located external to the search processor 202, that match keys for packet classification.

Figure 4:
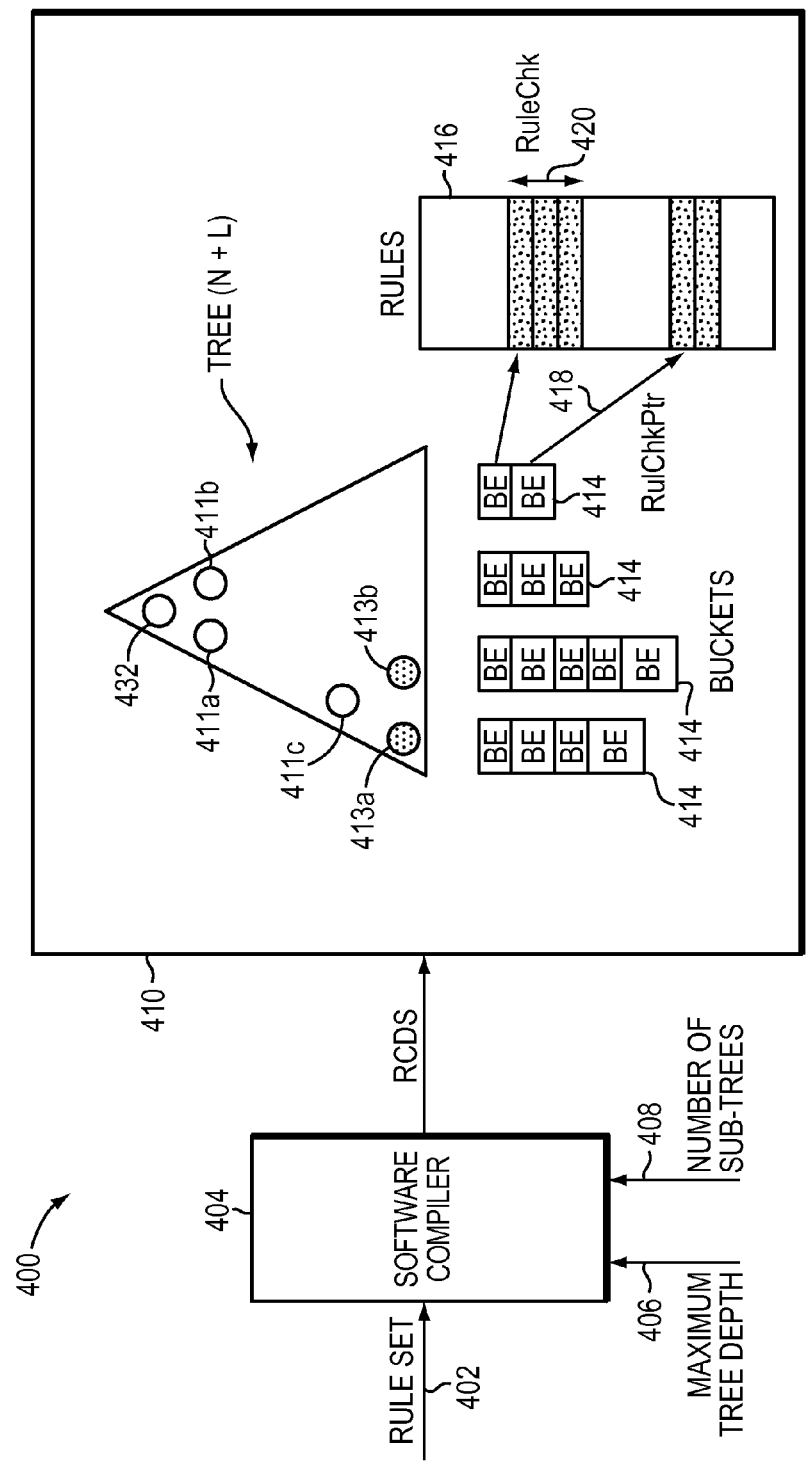
FIG. 4 is a block diagram illustrating an example embodiment of loading rules, by a software compiler, into an on-chip memory (OCM).

FIG. 4 is a block diagram 400 illustrating an example embodiment of loading rules, by a software compiler, into OCM components. According to an example embodiment, the software compiler 404 is software executed by a host processor or control plane processor to store rules into the search processor 202. Specifically, rules are loaded to at least one OCM component 324 of at least one memory cluster, or search block, 320 in the search processor 202. According to at least one example embodiment, the software compiler 404 uses multiple data structures, in storing the rules, in a way to facilitate the search of the stored rules at a later time. The software compiler 404 receives a rule set 402, parameter(s) indicative of a maximum tree depth 406 and parameter(s) indicative of a number of sub-trees 408. The software compiler 404 generates a set of compiled rules formatted, according at least one example embodiment, as linked data structures referred to hereinafter as rule compiled data structure (RCDS) 410. The RCDS is stored in at least one OCM component 324 of at least one memory cluster, or search block, 320 in the search processor 202. The RCDS 410 includes at least one tree 412. Each tree 412 includes nodes 411a-411c, leaf nodes 413a-413b, and a root node 432. A leaf node, 413a-413b, of the tree 412 includes or points to one of a set of buckets 414. A bucket 414 may be viewed as a sequence of bucket entries, each bucket entry storing a pointer or an address, referred to hereinafter as a chunk pointer 418, of a chunk of rules 420. Buckets may be implemented, for example, using tables, linked lists, or any other data structures known in the art adequate for storing a sequence of entries. A chunk of rules 420 is basically a chunk of data describing or representing one or more rules. In other words, a set of rules 416 stored in one or more OCM components 324 of the search processor 202 include chunks of rules 420. A chunk of rules 420 may be a sequential group of rules, or a group of rules scattered throughout the memory, either organized by a plurality of pointers or by recollecting the scattered chunk of rules 420, for example, using a hash function.

The RCDS 410 described in FIG. 4 illustrates an example approach of storing rules in the search engine. A person skilled in the art should appreciate that other approaches of using nested data structures may be employed. For example, a table with entries including chunk pointers 418 may be used instead of the tree 412. In designing a rule compiled data structure for storing and accessing rules used to classify data packets, one of the factors to be considered is enabling efficient and fast search or access of such rules.

Once the rules are stored in the search processor 202, the rules may then be accessed to classify data packets. When a host processor receives a data packet, the host processor forwards a lookup request with a packet header, or field, from the data packet to the search processor 202. On the search processor side, a process of handling the received lookup request includes:
1) The search processor receives the lookup request from the host processor. According to at least one example embodiment, the lookup request received from the host processor includes a packet header and a group identifier (GID).
2) The GID indexes an entry in a global definition/description table (GDT). Each GDT entry includes n number of table identifiers (TID), a packet header index (PHIDX), and key format table index (KFTIDX).
3) Each TID indexes an entry in a tree location table (TLT). Each TLT entry identifies which lookup engine or processor will look for the one or more matching rules. In this way, each TID specifies both who will look for the one or more matching rules and where to look for the one or more matching rules.
4) Each TID also indexes an entry in a tree access table (TAT). TAT is used in the context in which multiple lookup engines, grouped together in a super cluster, look for the one or more matching rules. Each TAT entry provides the starting address in memory of a collection of rules, or pointers to rules, called a table or tree of rules. The terms table of rules or tree of rules, or simply table or tree, are used interchangeably hereinafter. The TID identifies which collection or set of rules in which to look for one or more matching rules.
5) The PHIDX indexes an entry in a packet header table (PHT). Each entry in the PHT describes how to extract n number of keys from the packet header.
6) The KFTIDX indexes an entry in a key format table (KFT). Each entry in the KFT provides instructions for extracting one or more fields, e.g., parts of the packet header, from each of the n number of keys, which were extracted from the packet header.
7) Each of the extracted fields, together with each of the TIDs are used to look for subsets of the rules. Each subset contains rules that may possibly match each of the extracted fields.
8) Each rule of each subset is then compared against an extracted field. Rules that match are provided in responses, or lookup responses.

The handling of the lookup request and its enumerated stages, described above, are being provided for illustration purposes. A person skilled in the art should appreciate that different names as well as different formatting for the data included in a look up request may be employed. A person skilled in the art should also appreciate that at least part of the data included in the look up request is dependent on the design of the RCDS used in storing matching rules in a memory, or search, cluster 320.

Figure 5:
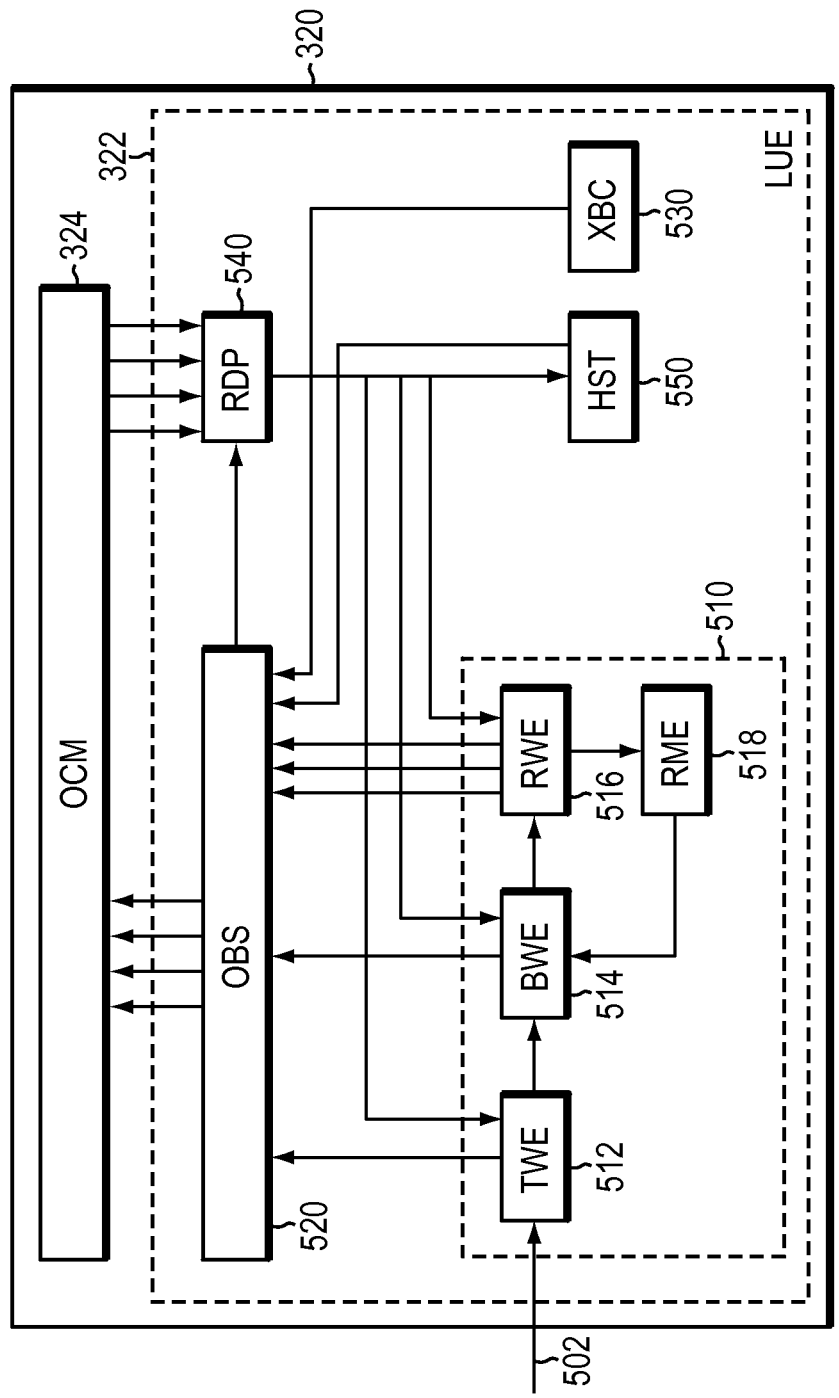
FIG. 5 shows a block diagram illustrating an example embodiment of a memory, or search, cluster.

FIG. 5 shows a block diagram illustrating an example embodiment of a memory, or search, cluster 320. The memory, or search, cluster 320 includes an on-chip memory (OCM) 324, a plurality of processing, or search, engines 510, an OCM bank slotter (OBS) module 520, and a cross-bar controller (XBC) 530. The OCM 324 includes one or more memory banks According to an example implementation, the OCM 324 includes two mega bytes (MBs) of memory divided into 16 memory banks According to the example implementation, the OCM 324 includes 64k, or 65536, of rows each 256 bits wide. As such, each of the 16 memory banks has 4096 contiguous rows, each 256 bits wide. A person skilled in the art should appreciate that the described example implementation is provided for illustration and the OCM may, for example, have more or less than 2 MBs of memory and the number of memory banks may be different from 16. The number of memory rows, the number of bits in each memory row, as well as the distribution of memory rows between different memory banks may be different from the illustration in the described example implementation. The OCM 324 is configured to store, and provide access to, the RCDS 410. In storing the RCDS 410, the distribution of the data associated with the RCDS 410 among different memory banks may be done in different ways. For example, different data structures, e.g., the tree data structure(s), the bucket storage data structure(s), and the chunk rule data structure(s), may be stored in different memory banks. Alternatively, a single memory bank may store data associated with more than one data structure. For example, a given memory bank may store a portion of the tree data structure, a portion of the bucket data structure, and a portion of the chunk rule data structure.

The plurality of processing engines 510 include, for example, a tree walk engine (TWE) 512, a bucket walk engine (BWE) 514, one or more rule walk engines (RWE) 516, and one or more rule matching engines (RME) 518. When the search processor 202 receives a request, called a lookup request, from the host processor, the LUF processor 304 processes the lookup request into one or more key requests, each of which has a key 502. The LUF processor 304 then schedules the key requests to the search cluster. The search cluster 320 receives a key 502 from the LUF processor 304 at the TWE 512. A key represents, for example, a field extracted from a packet header. The TWE 512 is configured to issue requests to access the tree 412 in the OCM 324 and receive corresponding responses. A tree access request includes a key used to enable the TWE 512 to walk, or traverse, the tree from a root node 432 to a possible leaf node 413. If the TWE 512 does not find an appropriate leaf node, the TWE 512 issues a no match response to the LUF processor 304. If the TWE 512 does find an appropriate leaf node, it issues a response that an appropriate leaf node is found.

The response that an appropriate leaf node is found includes, for example, a pointer to a bucket passed by the TWE 512 to the BWE 514. The BWE 514 is configured to issue requests to access buckets 414 in the OCM 324 and receive corresponding responses. The BWE 514, for example, uses the pointer to the bucket received from the TWE 512 to access one or more buckets 414 and retrieve at least one chunk pointer 418 pointing to a chunk of rules. The BWE 514 provides the retrieved at least one chunk pointer 418 to at least one RWE 516. According to at least one example, BWE 514 may initiate a plurality of rule searched to be processed by one RWE 516. However, the maximum number of outstanding, or on-going, rule searches at any point of time may be constrained, e.g., maximum of 16 rule searches. The RWE is configured to issue requests to access rule chunks 420 in the OCM 324 and receive corresponding responses. The RWE 516 uses a received chunk pointer 418 to access rule chunks stored in the OCM 324 and retrieve one or more rule chunks. The retrieved one or more rule chunks are then passed to one or more RMEs 518. An RME 518, upon receiving a chunk rule, is configured to check whether there is a match between one or more rules in the retrieved rule chunk and the field corresponding to the key.

The RME 518 is also configured to provide a response, to the BWE 514. The response is indicative of a match, no match, or an error. In the case of a match, the response may also include an address of the matched rule in the OCM 324 and information indicative of a relative priority of the matched rule. Upon receiving a response, the BWE 514 decides how to proceed. If the response is indicative of a no match, the BWE 514 continues searching bucket entries and initiating more rule searches. If at some point the BWE 514 receives a response indicative of a match, it stops initiating new rule searches and waits for any outstanding rule searches to complete processing. Then, the BWE 514 provides a response to the host processor through the LUF processor 304, indicating that there is a match between the field corresponding to the key and one or more rules in the retrieved rule chunk(s), e.g., a "match found" response. If the BWE 514 finishes searching buckets without receiving any "match found" response, the BWE 514 reports a response to the host processor through the LUF processor 304 indicating that there is no match, e.g., "no-match found" response. According to at least one example embodiment, the BWE 514 and RWE 516 may be combined into a single processing engine performing both bucket and rule chunk data searches. According to an example embodiment the RWEs 516 and the RMEs 518 may be separate processors. According to another example embodiment, the access and retrieval of rule chunks 420 may be performed by the RMEs 518 which also performs rule matching. In other words, the RMEs and the RWEs may be the same processors.

Access requests from the TWE 512, the BWE 514, or the RWE(s) are sent to the OBS module 520. The OBS module 520 is coupled to the memory banks in the OCM 324 through a number of logical, or access, ports, e.g., M ports. The number of the access ports enforce constraints on the number of access requests that may be executed, or the number of memory banks that may be accessed, at a given clock cycle. For example, over a typical logical port no more than one access request may be executed, or sent, at a given clock cycle. As such, the maximum number of access requests that may be executed, or forwarded to the OCM 324, per clock cycle is equal to M. The OBS module 520 includes a scheduler, or a scheduling module, configured to select a subset of access requests, from multiple access requests received in the OBS module 520, to be executed in at least one clock cycle and to schedule the selected subset of access requests each over a separate access port. The OBS module 520 attempts to maximize OCM usage by scheduling up to M access requests to be forwarded to the OCM 324 per clock cycle. In scheduling access requests, the OBS module 520 also aims at avoiding memory bank conflict and providing low latency for access requests. Memory bank conflict occurs, for example, when attempting to access a memory bank by more than one access request at a given clock cycle. Low latency is usually achieved by preventing access requests from waiting for a long time in the OBS module 520 before being scheduled or executed.

Upon data being accessed in the OCM 324, a response is then sent back to a corresponding engine/entity through a "Read Data Path" (RDP) component 540. The RDP component 540 receives OCM read response data and context, or steering, information from the OBS. Read response data from each OCM port is then directed towards the appropriate engine/entity. The RDP component 540 is, for example, a piece of logic or circuit configured to direct data responses from the OCM 324 to appropriate entities or engines, such as TWE 512, BWE 514, RWE 516, a host interface component (HST) 550, and a cross-bar controller (XBC) 530. The HST 550 is configured to store access requests initiated by the host processor or a respective software executing thereon. The context, or steering, information tells the RDP component 540 what to do with read data that arrives from the OCM 324. According to at least one example embodiment, the OCM 324 itself does not contain any indication that valid read data is being presented to the RDP component 540. Therefore, per-port context information is passed from the OBS module 520 to the RDP component 540 indicating to the RDP component 540 that data is arriving from the OCM 324 on the port, the type of data being received, e.g., tree data, bucket data, rule chunk data, or host data, and the destination of the read response data, e.g., TWE 512, BWE 514, RWE 516, HST 550 or XBC 530. For example, tree data is directed to TWE 512 or XBC 530 if remote, bucket data is directed to BWE 514 or XBC if remote, rule chunk data is directed to RWE 516 or XBC 530 if remote, and host read data is directed to the HST 550.

The search cluster 320 also includes the crossbar controller (XBC) 530 which is a communication interface managing communications, or transport operations, between the search cluster 320 and other search clusters through the crossbar (XBAR) 312. In other words, the XBC 530 is configured to manage pushing and pulling of data to, and respectively from, the XBAR 312.

According to an example embodiment, for rule processing, the processing engines 510 include a tree walk engine (TWE) 512, bucket walk engine (BWE) 514, rule walk engine (RWE) 516 and rule match engine (RME) 518. According to another example embodiment, rule processing is extended to external memory and the BPP 307 also includes a RWE 516 and RME 518, or a RME acting as both RWE 516 and RME 518. In other words, the rules may reside in the on-chip memory and in this case, the RWE or RME engaged by the BWE, e.g., by passing a chunk pointer, is part of the same LUE as BWE. As such, the BWE engages a "local" RWE or RME. The rules may also reside on a memory located external to the search processor 202, e.g., off-chip memory. In this case, which may be referred to as rule processing extended to external memory or, simply, "rule extension," the bucket walk engine does not engage a local RWE or RME. Instead, the BWE sends a request message, via the MWA 303 and MBC 305, to a memory controller to read a portion, or chunk, of rules. The BWE 514 also sends a "sideband" message to the BPP 307 informing the BPP 307 that the chunk, associated with a given key, is stored in external memory.

The BPP 307 starts processing the chunk of rules received from the external memory. As part of the processing, if the BPP 307 finds a match, the BPP 307 sends a response, referred to as a lookup response or sub-tree response, to the LUF processor 304. The BPP 307 also sends a message to the LUEs component 322 informing the LUEs component 322 that the BPP 307 is done processing the chunk and the LUEs component 322 is now free to move on to another request. If the BPP 307 does not find a match and the BPP 307 is done processing the chunk, the BPP 307 sends a message to the LUEs component 322 informing the LUEs component 322 that the BPP 307 is done processing and to send the BPP 307 more chunks to process. The LUEs component 322 then sends a "sideband" message, through the MWA 303 and MBC 305, informing the BPP 307 about a next chunk of rules, and so on. For the last chunk of rules, the LUEs component 322 sends a "sideband" message to the BPP 307 informing the BPP 307 that the chunk, which is to be processed by the BPP 307, is the last chunk. The LUEs component 322 knows that the chunk is the last chunk because the LUEs component 322 knows the total size of the set of rule chunks to be processed. Given the last chunk, if the BPP 307 does not find a match, the BPP 307 sends a "no-match" response to the LUF processor 304 informing the LUF processor 304 that the BPP 307 is done with the set of rule chunks. In turn, the LUEs component 322 frees up the context, e.g., information related to the processed key request or the respective work done, and moves on to another key request.

Figure 6A:
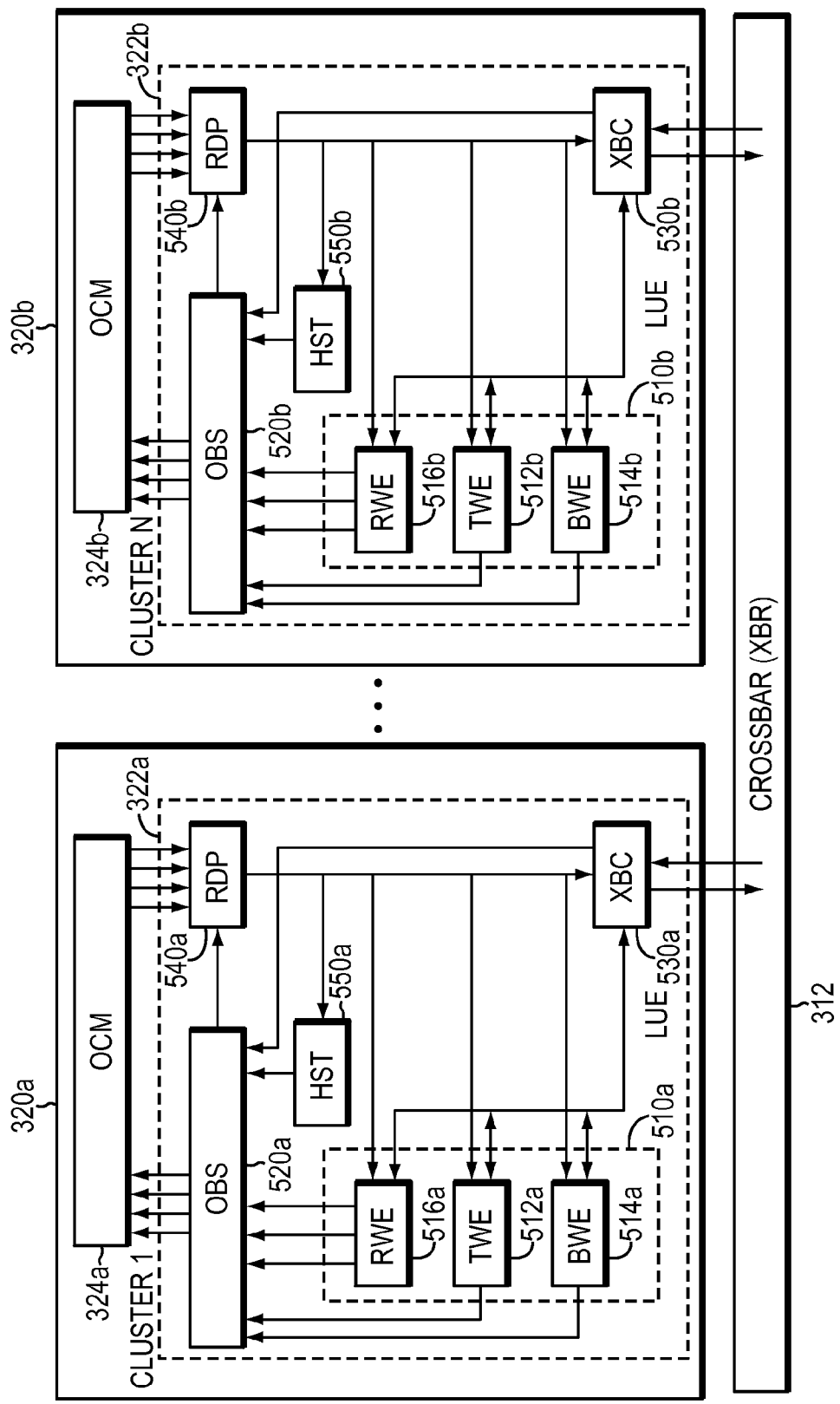
FIGS. 6A-6B show block diagrams illustrating example embodiments of transport operations between two search clusters.

FIG. 6A shows a block diagram illustrating an example embodiment of processing a remote access request between two search clusters. A remote access request is a request generated by an engine/entity in a first search cluster to access data stored in a second search cluster or memory outside the first search cluster. For example, a processing engine in cluster 1, 320a, sends a remote access request for accessing data in another cluster, e.g., cluster N 320b. The remote access request may be, for example, a tree data access request generated by a TWE 512a in cluster 1, a bucket access request generated by a BWE 514a in cluster 1, or a rule chunk data access request generated by a RWE 516a or RME in cluster 1. The remote access request is pushed by the XBC 530a of cluster 1 to the XBAR 312 and then sent to the XBC 530b of cluster N. The XBC 530b of cluster N then forwards the remote access request to the OBS module 520b of cluster N. The OBS module 520b directs the remote access request to OCM 324b of cluster N and a remote response is sent back from the OCM 324b to the XBC 530b through the RDP 540b. The XBC 530b forwards the remote response to the XBC 530a through the XBAR 312. The XBC 530a then forwards the remote response to the respective processing engine in the LUEs component 322a.

Figure 6B:
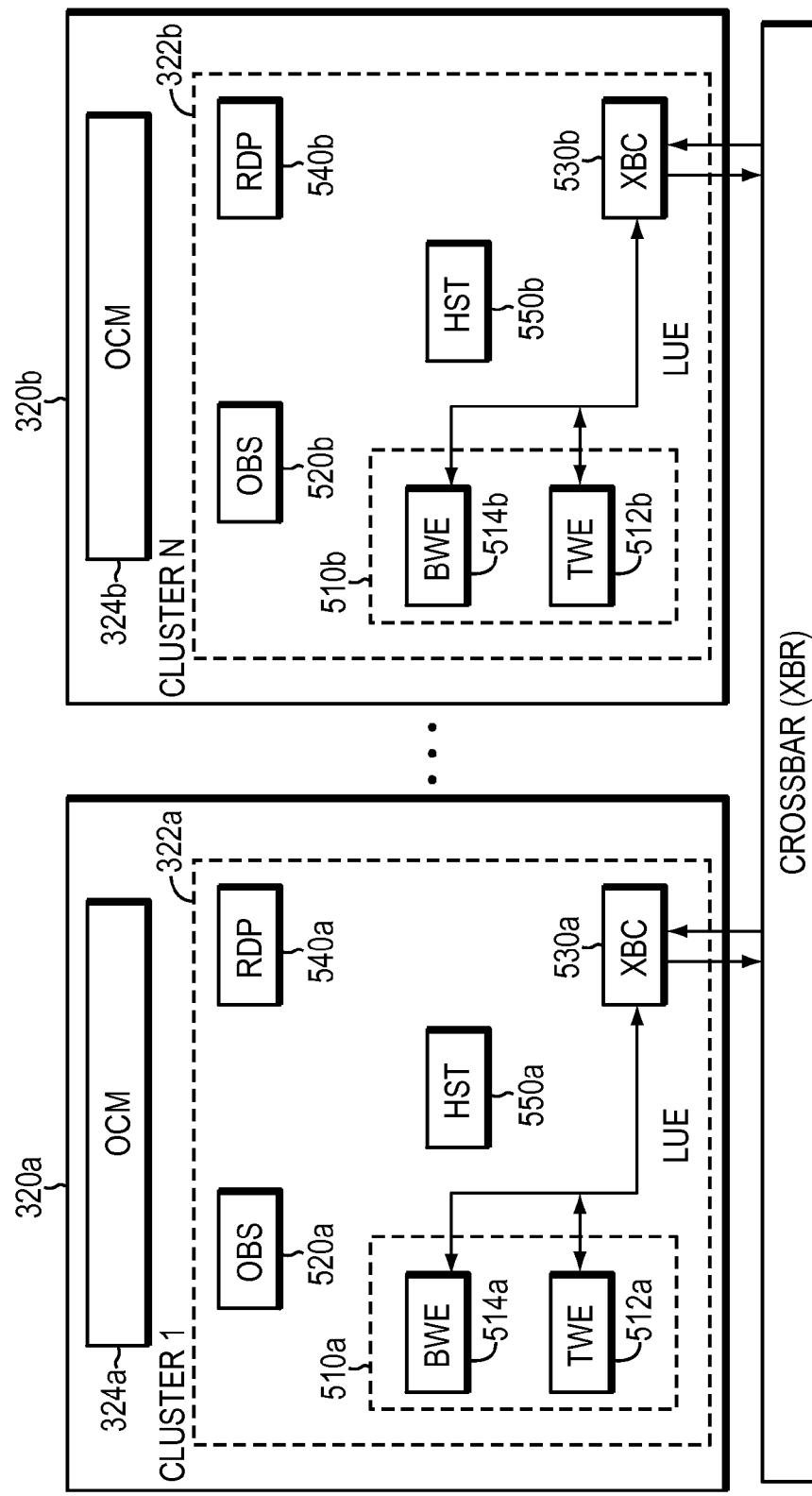

FIG. 6B shows a block diagram illustrating an example embodiment of a processing thread migration between two search clusters. Migration requests originate from a TWE 512 or BWE 514 as they relate mainly to a bucket search/access process or a tree search/access process, in a first cluster, that is configured to continue processing in a second cluster. Unlike remote access where data is requested and received from the second cluster, in processing thread migration the process itself migrates and continues processing in the second cluster. As such, information related to the processing thread, e.g., state information, is migrated to the second cluster from the first cluster. As illustrated in FIG. 6B, processing thread migration requests are sent from TWE 512a or BWE 514a directly to the XBC 530a in the cluster 1, 320a. The XBC 530a sends the migration request through the crossbar (XBAR) 312 to the XBC 530b in cluster N, 320b. At the receiving cluster, e.g., cluster N 320b, the XBC 530b forwards the migration request to the proper engine, e.g., TWE 512b or BWE 514b. According to at least one example embodiment, the XBC, e.g., 530a and 530b, does not just forward requests. The XBC arbitrates which, among remote OCM requests, OCM response data, and migration requests, to be sent at a clock cycle.

Figure 7A:
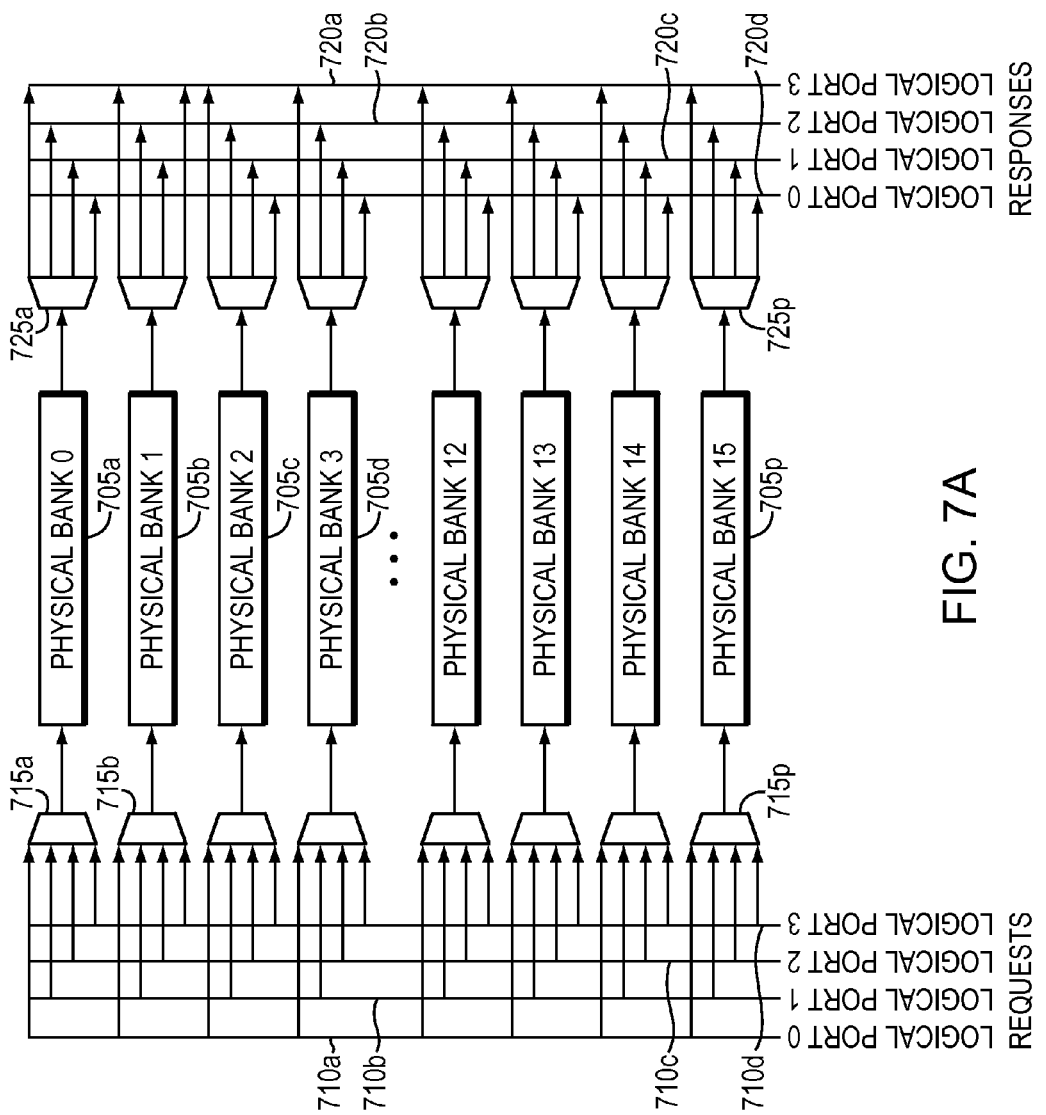
FIG. 7A shows an example hardware implementation of the OCM in a search cluster.

FIG. 7A shows an example hardware implementation of the OCM 324 in a cluster 320. According to the example implementation shown in FIG. 7, the OCM includes a plurality, e.g., 16, single-ported memory banks 705a-705p. Each memory bank, for example, includes 4096 memory rows, each of 256 bits width. A person skilled in the art should appreciate that the number, e.g., 16, of the memory banks and their storage capacity are chosen for illustration purposes and should not be interpreted as limiting. Each of the memory banks 705a-705p is coupled to at least one input multiplexer 715a-715p and at least one output multiplexer 725a-725p. Each input multiplexer, among the multiplexers 715a-715p, couples the input logical ports 710a-710d to a corresponding memory bank among the memory banks 705a-705p. Similarly, each output multiplexer, among the multiplexers 725a-725p, couples the output logical ports 720a-720d to a corresponding memory bank among the memory banks 705a-705p.

The input logical ports 710a-710d carry access requests' data from the OBS module 520 to respective memory banks among the memory banks 705a-705p. The output logical ports 720a-720d carry access responses' data from respective memory banks, among the memory banks 705a-705p, to RDP component 540. Given that the memory banks 705a-705p are single-ported, at each clock cycle a single access is permitted to each of the memory banks 705a-705p. Also given the fact that there are four input logical/access ports, a maximum of four requests may be executed, or served, at a given clock cycle because no more than one logical port may be addressed to the same physical memory bank at the same clock cycle. For a similar reason, e.g., four output logical/access ports, a maximum of four responses may be sent out of the OCM 324 at a given clock cycle. An input multiplexer is configured to select a request, or decide which request, to access the corresponding physical memory bank. An output multiplexer is configured to select an access port on which a response from a corresponding physical memory bank is to be sent. For example, an output multiplexer may select an output logical port, to send a response, corresponding to an input logical port on which the corresponding request was received. A person skilled in the art should appreciate that other implementations with more, or less, than four ports may be employed.

According to an example embodiment, an access request is formatted as an 18 bit tuple. Among the 18 bits, two bits are used as wire interface indicating an access instruction/command, e.g., read, write, or idle, four bits are used to specify a memory bank among the memory banks 705a-705p, and 12 bits are used to identify a row, among the 4096 rows, in the specified memory bank. In the case of a "write" command, 256 bits of data to be written are also sent to the appropriate memory bank. A person skilled in the art should appreciate that such format/structure is appropriate for the hardware implementation shown in FIG. 7. For example, using 4 bits to specify a memory bank is appropriate if the total number of memory banks is 16 or less. Also the number of bits used to identify a row is correlated to the total number of rows in each memory bank. Therefore, the request format described above is provided for illustration purpose and a person skilled in the art should appreciate that many other formats may be employed.

The use of multi-banks as suggested by the implementation in FIG. 7, enables accessing multiple physical memory banks per clock cycle, and therefore enables serving, or executing, more than one request/response per clock cycle. However, for each physical memory bank a single access, e.g., read or write, is allowed per clock cycle. According to an example embodiment, different types of data, e.g., tree data, bucket data, or rule chunk data, are stored in separate physical memory banks. Alternatively, a physical memory bank may store data from different types, e.g., tree data, bucket data, and rule chunk data. Using single-ported physical memory banks leads to more power efficiency compare to multi-port physical memory banks However, multi-port physical memory banks may also be employed.

Figure 7B:
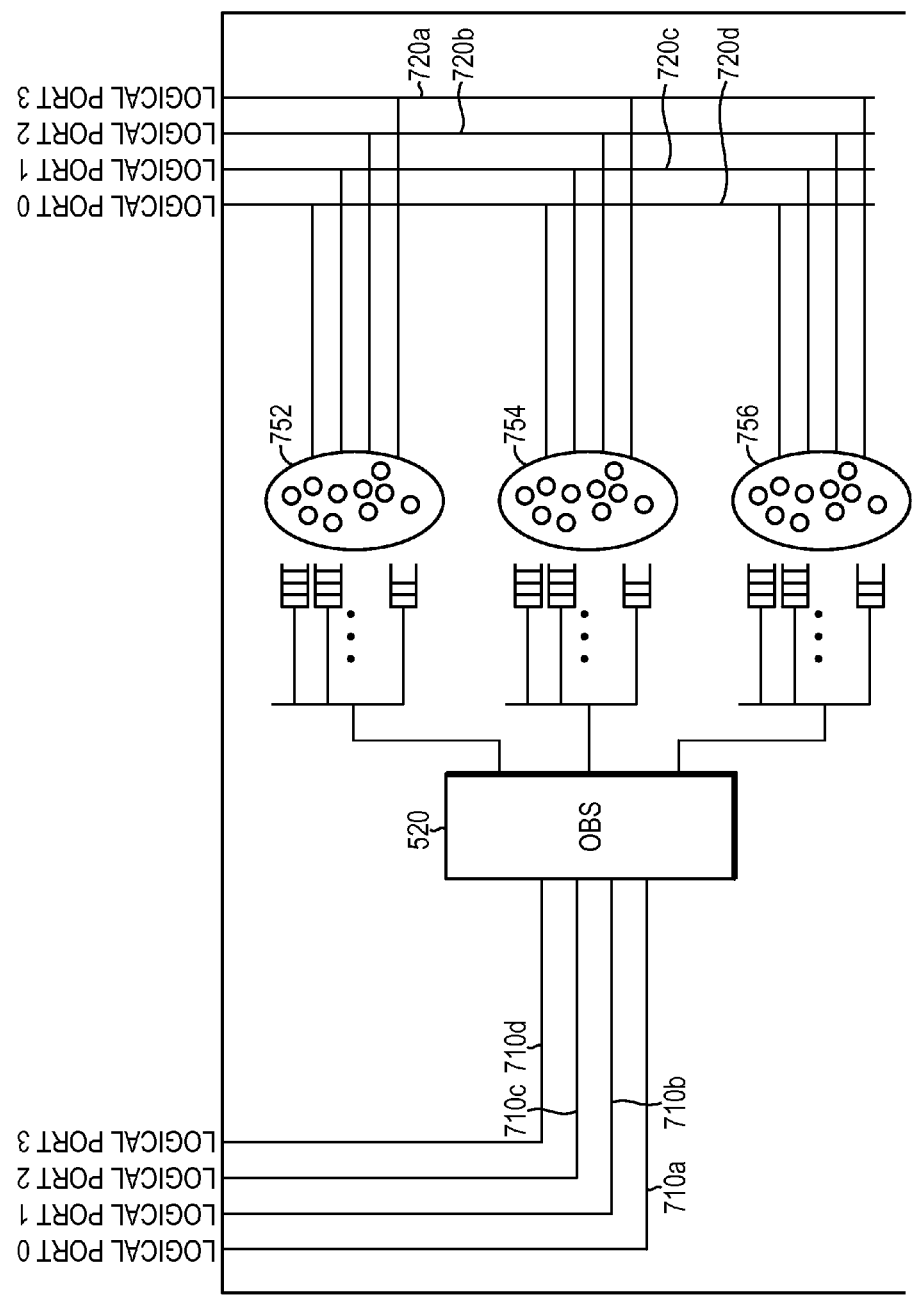
FIG. 7B is a block diagram illustrating coupling between the OCM, search engines and OCM bank slotter (OBS) module.

FIG. 7B shows a block diagram illustrating the coupling between the OCM 324, the LUE engines, e.g., TWE 512, BWE 514, RWE 516, and RME 518, and the OBS module 520. According to an example embodiment, the LUE includes hardware-assisted (HW-assisted) processing threads, such as TWE threads to traverse a tree, BWE threads to process a bucket, RWE threads to pull rule chunk data, and RME threads to check matching between rule(s) and a key. The RWE and RME threads may be viewed as the same threads, e.g., RME threads, performing pulling and matching of rule chunk data. The processing threads may be viewed into pools, called TWE thread pool 752, BWE thread pool 754, and RWE thread pool 756.

Within each cluster 320, the OBS module 520 looks across the processing thread pools and across all access requests within each pool and selects a subset of access requests to be executed, or served. The OBS module 520 then schedules the selected subset of access requests to be executed in at least one clock cycle over one or more access ports. The scheduled access requests may then be executed, or served, in the respective clock cycle(s). The OBS module's output is coupled to the input logical/access ports 710a-710d of FIG. 7A. According to at least one example embodiment, the OBS module 520 attempts to execute, or serve, at each clock cycle a number of access requests equal to the number of logical/access ports, e.g., 4. As such, the OBS module 520, serves as many processing threads as possible per clock cycle. Therefore, according to an example embodiment, given a search processor, such as the search processor of FIG. 3 with 16 clusters each with a multi-ported OCM and a maximum number of four access requests executed, or served, per cycle, a maximum total of 64 access requests are made possible per clock cycle.

The OBS module 520 manages the logical ports into the OCM 324. Each of the logical ports allows access to any one of a number, e.g., 16, of physical memory banks of the OCM, e.g., each logical port is not fixed to a unique subset of physical memory banks. The OBS is responsible of preventing physical memory bank collisions. The OBS issues up to a maximum number, e.g., 4, of non-overlapping access requests assigned to different physical memory banks every clock cycle. According to an example embodiment, a software (SW) associated with the host processor, e.g., software compiler 404, may assign specific physical memory banks on the OCM 324 to store data of a given type, e.g., tree data, bucket data, or rule chunk data. According to at least one example embodiment, when specific banks across the logical ports are non-overlapping, maximum performance may be achieved by serving the maximum number of access requests, e.g., equal to total number of access ports, per clock cycle.

According to at least one example embodiment, a lookup thread inside the LUE representing a process, traverses multiple thread pools or "stages" during processing. In the first stage, the TWE thread walks a tree structure to a leaf node. The process, or work, then is passed to the BWE to perform bucket walk processing. If the work is passed to a BWE in a different cluster, from the cluster of the TWE passing the work, the transfer of the process, or work, is referred to as processing thread migration. In the second stage, the BWE tracks and processes a bucket list. The BWE works in concert with the RWE or RME and work is passed to the RWE or RME. In the third stage, the RWE, or RME, fetches rules, or chunks of rules, associated with a retrieved bucket entry. Each of these stages is assigned to, or performed by, one or more engines, e.g., TWE, BWE, RWE, or RME, within their respective thread pools, e.g., TWE thread pool, BWE thread pool, RWE or RME thread pool.

According to at least one example embodiment, memory buffers, e.g., first in first out (FIFO) or collapse FIFO buffers, are employed to store access requests waiting to be executed or scheduled for execution. The memory buffers may be implemented as an interface between the LUE engines and the OBS module. Alternatively, the memory buffers may be implemented within the OBS module 520. The LUE engines are also coupled to the output logical/access ports 720a-720d via the RDP component 540. The output logical/access ports are configured to transport responses from the OCM 324 to respective LUE engines.

While FIG. 7A shows an OCM with 16 physical memory banks, in general, the number of physical memory banks per OCM may be more, or less, than 16. Also the number of input and output access ports is not restricted to four ports, as shown in FIGS. 7A and 7B, and may be more or less than four. According to an example embodiment, a particular access port, e.g., logical port 0, may be assigned to carry write type requests while all logical ports may carry read type requests. Alternatively, the logical ports may be designed so that all input logical ports support both write and read type requests. Output, or response, logical ports may be managed in a way that each response, or output, logical port is tied to a single corresponding request, or input, logical port. For example, output logical port 1 is tied to, or configured to carry responses corresponding to requests sent over, input logical port 1. A skilled person in the art should appreciate that other approaches of managing the input and output ports may be employed. Input multiplexers, 715a-715p, may be controlled by a logic function to determine which input logical port is to carry a particular request to a corresponding physical memory bank. Similarly, output multiplexers, 725a-725p, may be controlled by a logic function to determine which of the physical memory banks is to send a response on a particular output logical port.

Figure 8A:
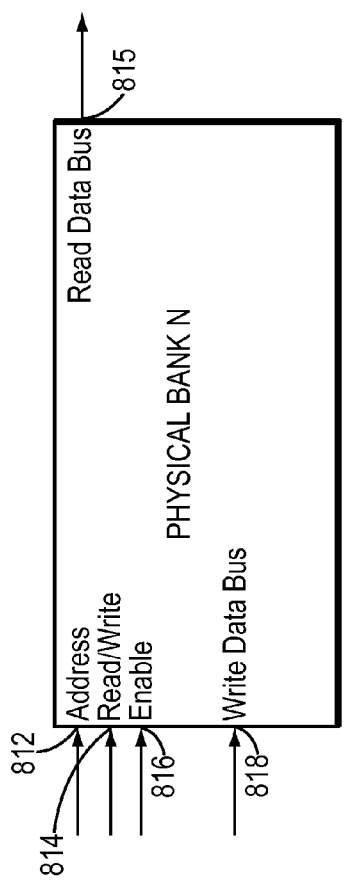

FIGS. 8A-8D show different types of physical memory banks FIG. 8A shows a block diagram of a single-port physical memory bank, or component, that supports read and write operations. According to at least one example embodiment, the single-port physical memory bank includes a single address interface 812 configured to receive data bits identifying a memory address, an operation type interface 814 configured to receive a signal indicating the type of operation, e.g., read or write, to be handled, an input data bus interface 818 for receiving data to be written in the single-port physical memory bank and an enable interface 816 for receiving a signal to enable the single-port physical memory bank. The single-port physical memory bank also includes an output data bus interface 815 for outputting read data to be sent over output logical ports.

Figure 8B:
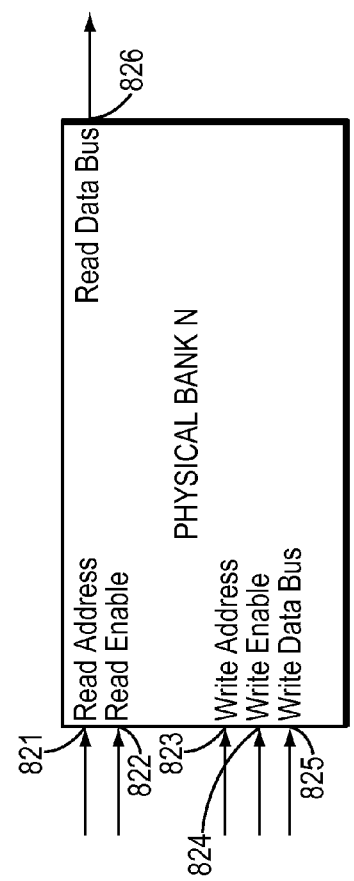

FIG. 8B shows a block diagram of a two-port physical memory bank, or component. According to an example embodiment, the two-port physical memory bank includes a dedicated read port/interface containing a read address interface 821 and a read enable interface 822 configured to receive a signal to enable a read operation. The two-port physical memory bank also includes a dedicated write port/interface containing an address interface 823 configured to receive a data bits identifying a memory address, a write data bus interface 825 for receiving data to be written, and a write enable interface 824 for receiving a signal enabling a write operation. The two-port physical memory bank further includes an output data bus interface 826 for outputting read data to be sent over output logical ports. As such, requests which are of the read type are driven to the read address interface 821 and the read enable interface 822. Requests which are of the write type are driven to the write address interface 823, the write enable interface 824, and the write data bus interface 825.

FIG. 8C shows a block diagram of a dual-port physical memory bank, or component. According to an example embodiment, the dual-port physical memory bank includes two ports, each capable of servicing both read or write requests. Each port has an address interface, 831a or 831b, configured to receive an indication of a memory address, an enable interface, 832a or 832b, configured to receive a signal for enabling a read or write operation, an operation type interface, 833a or 833b, configured to receive a signal indicating the type of operation, e.g., read or write, to be handled, and an input data bus interface, 834a or 834b, for receiving data to be written to the dual-port physical memory bank. The dual-port physical memory bank further includes two output data bus interfaces, 835a and 835b, for outputting read data to be sent over output logical ports. Requests of read or write types are driven to one of the two ports. The write data bus interface is used only in the case of a write operation.

FIG. 8D shows a block diagram of a quad-port physical memory bank, or component. The quad-port physical memory bank includes four input ports similar to the two ports in FIG. 8C and four output data bus interfaces, 835a-835d, for outputting read data to be sent over output logical ports. Each of the four input ports supports read or write operations. Using a quad-port physical memory bank, each of the logical ports, 710a-710d, may be coupled, or connected, to a corresponding input port of the quad-port physical memory bank. With such coupling, or connections, the input and output multiplexers may be omitted and not used. Furthermore, even the enable signals and the write data may be driven directly from the input logical ports. A logic function is still needed at the output of the physical memory banks to control the selection of physical memory bank response data to each of the logical ports. The quad-port physical memory bank, shown in FIG. 8D, illustrates an example of a physical memory bank having a number of ports equal to the number of logical ports used in the architecture of the OCM. The architecture of the OCM shown in FIG. 7A may employ any of the physical memory banks shown in FIGS. 8A-8D, or other types of physical memory banks.

According to at least one example embodiment, a clock signal supplied to the memory banks in the OCM may be turned off, or disabled, in order to save on power consumption by the search engine. For example, the clock signal may be disabled for a particular memory bank when it is not used, or for the OCM 324 if the latter is not being used, e.g., searched, or is not storing any data. The disabling of the clock signal may be performed through the host software or hardware. When using hardware to disable a clock cycle for a particular OCM, the disabling is permanent and the particular OCM may not be used to store data.

Figure 9:
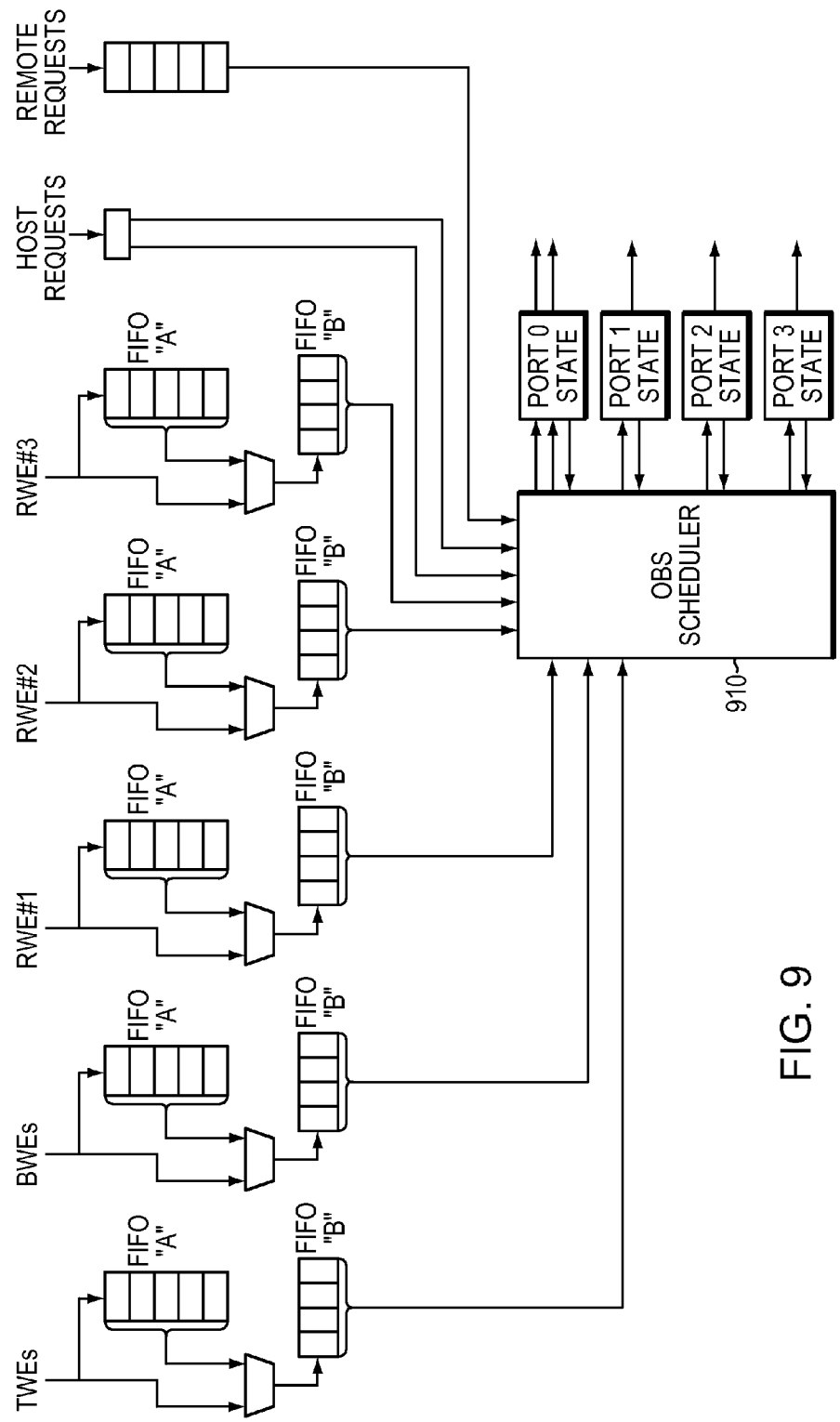
FIG. 9 illustrates example architecture of the OBS module.

FIG. 9 illustrates an example architecture of the OBS module 520. The OBS module 520 includes a scheduler or a scheduling module 910 configured to select a subset of access requests to be executed and schedule the selected subset of access requests to be executed in at least one clock cycle over one or more access ports. The OBS module 520 includes, or is coupled to, one or more memory buffers configured to store access requests to be scheduled for execution. According to at least one example embodiment, one or more memory buffers may be assigned to each type of access request. In the example of FIG. 9, collapsible FIFO buffers are employed for TWE, BWE and RWE access requests. A collapsible FIFO buffer includes two buffers, e.g., "A" and "B." The OBS scheduler 910 selects access requests from the "B" buffers and the popped entry is not necessarily at the head of the "B" buffer.

Incoming TWE, BWE, or RWE access requests are pushed directly to a corresponding "B" buffer if not full and the corresponding "A" buffer is empty. Otherwise, the incoming TWE, BWE, or RWE access requests are pushed to the corresponding "A" buffer. When "B" buffer is not full and the corresponding "A" buffer is not empty, a logic function examines the access requests stored in the buffer "B" and pulls an access request from the corresponding buffer "A" adding it to the buffer "B". In pulling an access request, the logic function gives priority to an access request associated with a memory bank different from the memory banks associated with the access requests already stored in the buffer "B". The OBS scheduler 910 selects TWE, BWE, or RWE access requests from the "B" buffers. The "A" buffers may vary in size for TWE, BWE, and RWE requests. However, the number of entries in the "B" buffers may be sized to be equal to, or greater than, the total number of logical ports. As such even if only one collapsible FIFO buffer is full while the others are empty, the OBS scheduler 910 still can schedule enough requests across all logical ports. The structure of collapsible FIFO buffers, for TWE, BWE, and RWE, may be the same, however, the number of collapsible FIFO buffers assigned to RWE access requests may be larger than the number collapsible FIFO buffers for TWE or BWE access requests. Separate buffers are designated for host processor requests and remote requests. A per-port state logic influences what requests are serviced by the OBS scheduler 910 by keeping track of what access requests, and of what type, have already been scheduled to be executed by the port in the future.

Figure 10A:
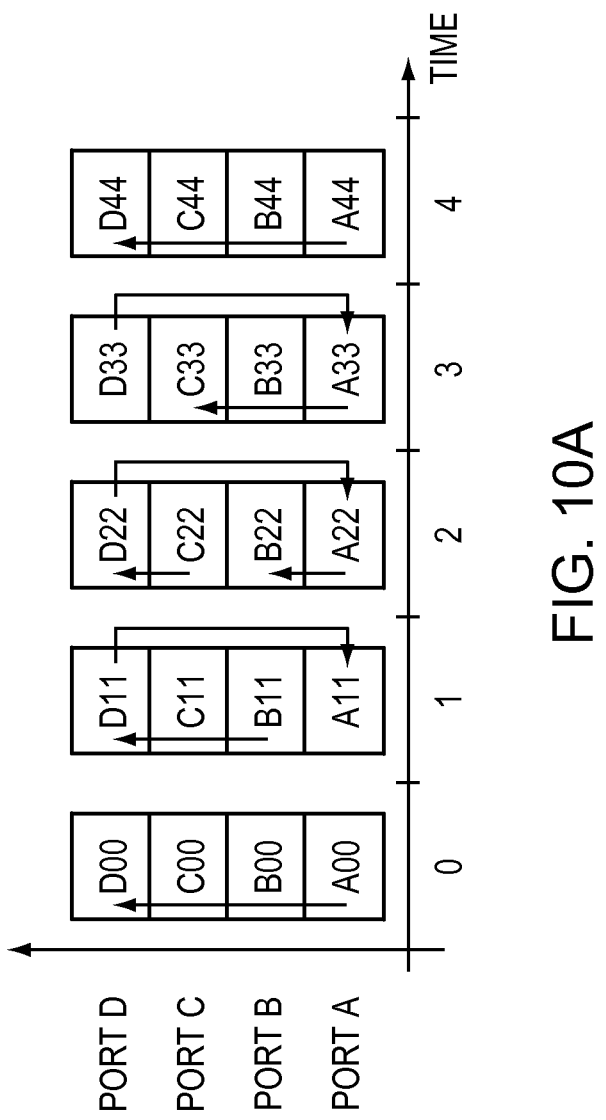
FIGS. 10A-10D show graphical representations of different approaches of scheduling access requests.

FIGS. 10A-10D show graphical representations of different approaches in scheduling access requests. FIG. 10A, shows a first approach of scheduling access requests, according to at least one example embodiment. At each clock cycle, a number of access requests, equal to the total number of logical ports, are scheduled to be executed in a single clock cycle. In FIG. 10A, assuming a total of four logical/access ports, e.g., A, B, C, and D, four access requests are scheduled at a given clock cycle to be executed, for example, at the same clock cycle. A scheduled access request is indicated, in FIG. 10A, by a code including a letter indicative of the logical port over which the access request is scheduled followed, consecutively, by the time slot at which the scheduling is performed and the time slot at which the access request is to be executed, or served. For example "A00" specifies an access request scheduled during the time slot 0 to be executed at time slot 0 over the logical port A, while "Cxy" specifies an access request scheduled during the time slot x to be executed at the time slot y over the logical port C. In the example approach of FIG. 10A, at each clock cycle, four access requests are scheduled for execution in the same clock cycle over the four logical ports.

The arrows in FIG. 10A indicate the priorities, or the order, for scheduling access requests over the different logical ports. For example at time slot 0, the logical port A is prioritized followed consecutively by the logical ports B, C, and D. At the time slot 1, the priorities are shifted and the logical port B is prioritized followed consecutively by the logical ports C, D, and A. According to at least one example embodiment, at each clock cycle the priorities are shifted to establish "fairness," or equal weights, to different logical ports over time. An access request associated with a logical port with higher priority is scheduled before another access request associated with a logical port with less priority. For example, at time slot 0 a decision is made for port A, the result of which affects the decision for port B, the result of which affects the decision for port C, which affects the decision for port D. As such the scheduling for example of C00 depends on the prior scheduled access requests B00 and A00. In other words, the access request C00 may not be associated with memory banks corresponding to access requests A00 and B00. Similarly the scheduling of the access request B33, for example, depends on the prior scheduled access requests D33 and A33. The approach in FIG. 10A enables scheduling of all possible access requests to all ports over a single clock cycle. However, a least priority logical port is assigned an access request for execution after higher priority logical ports are already assigned access requests. As such least priority logical ports experience delay in scheduling compared to higher priority logical ports leading. The clock cycle needs to be long enough to enable processing the dependencies based on priorities. Therefore, implementation of the approach described in FIG. 10A is relatively slow with low clock switching frequency.

Figure 10B:
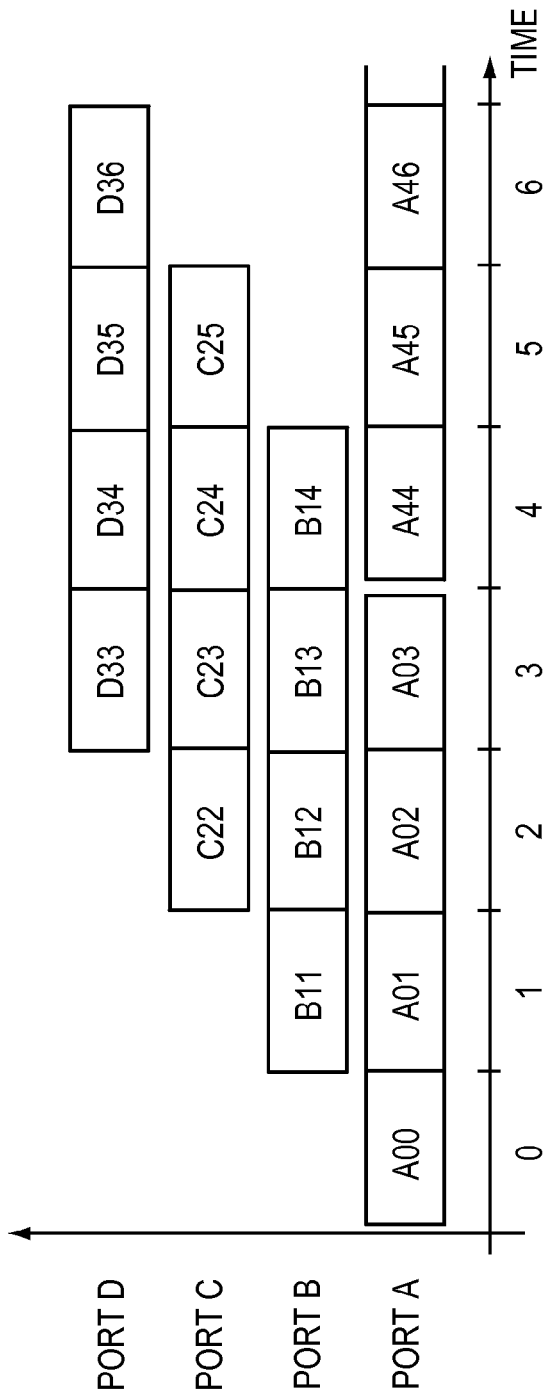

FIG. 10B shows a second scheduling approach allowing pre-scheduling. A number of access requests, e.g., equal to the total number of ports, is scheduled at a given time slot to be executed over a single logical port at a number of clock cycles equal to the number of access requests. For example, at time slot 0, access request A00, A01, A02, and A03 are scheduled to be executed over port A at clock cycles 0, 1, 2, and 3, respectively. At time slot 1, the access requests B11, B12, B13, and B14 are scheduled to be executed over port B at clock cycles 1, 2, 3, and 4, respectively. In this second approach, the scheduling of B11 at time slot 1, for example, depends on the previously scheduled A01. Also the scheduling of D33 at time slot 3, for example, depends on the previously scheduled A03, B13, and C23. While enabling pre-scheduling, this second scheduling approach results in less flexibility. For example, in this approach it is difficult to schedule access requests that require multiple clock cycles, such RWE access requests, since at each clock cycle previously scheduled access requests limit the scheduling choices. The pre-scheduling and the limit in scheduling choices, at a given clock cycle, may increase latency for some access requests.

Figure 10C:
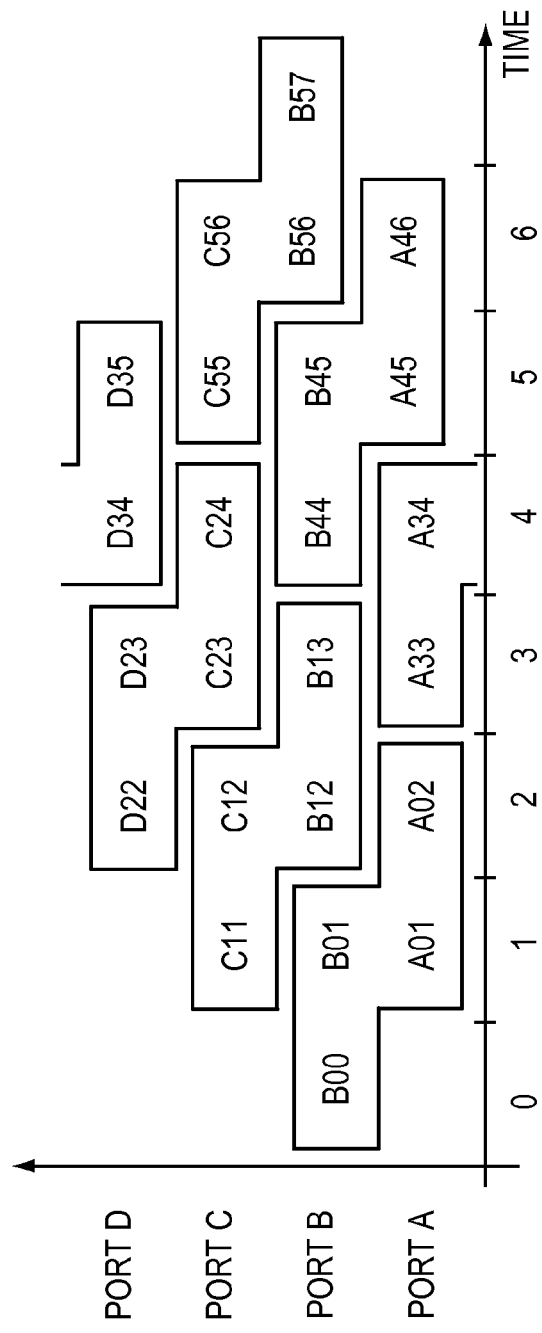

FIG. 10C shows a third scheduling approach where a number of access requests, e.g., equal to the total number of logical ports, are scheduled during a given clock cycle to be executed over two or more access ports and in a number of clock cycles less than the total number of access ports. For example, at time slot 0, the access requests B00, B01, A01, and A02 are scheduled to be executed over ports A and B at the clock cycles 0, 1, and 2. At time slot 1, the access requests C11, C12, B12, and B13 are scheduled to be executed over ports C and B at the clock cycles 1, 2, and 3. The third scheduling approach may be viewed as a middle ground between the first scheduling approach and the second scheduling approach as it allows scheduling of more than one access request, e.g., B01 and A01, for execution in a single clock cycle and also allows pre-scheduling. When scheduling B01 at time slot 0, the decision is dependent on prior scheduled A01, assuming that port A is of higher priority than port B. Also at time slot 1, the scheduling of C11 is dependent on B01 and A01 which were scheduled in the previous clock cycle. The scheduling of C12 at clock cycle 2 depends on B12, which is scheduled prior to C12 but in the same clock cycle, and on A02 previously scheduled in previous clock cycle. This approach still includes significant number of scheduling dependencies effective at the same scheduling time slot, e.g., dependencies between B01 and A01 or C12 and B12, which may render the corresponding implementation slow.

Figure 10D:
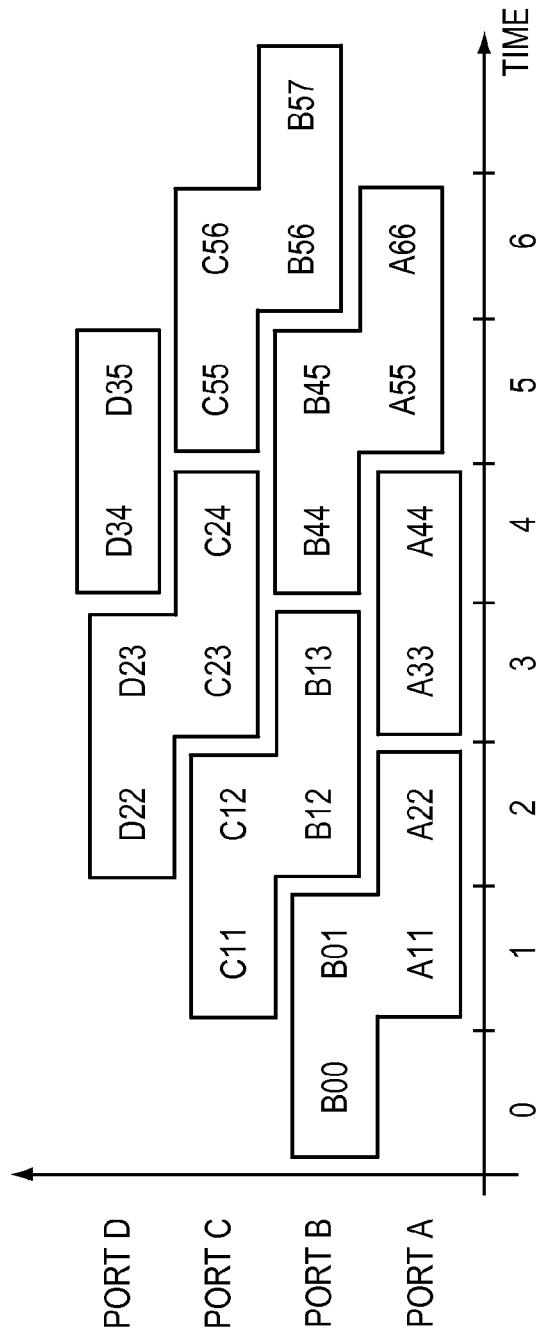

FIG. 10D shows a fourth scheduling approach, which may be viewed as a modified version of the third scheduling approach aimed at reducing scheduling dependencies effective at the same scheduling time slot. While in the third approach, the number of access requests scheduled at each clock cycle is equal to the total number of logical ports, in the fourth approach the number of scheduled access requests at a given clock cycle may be less, or larger, than the total number of logical ports by allowing back filling, e.g., at port A. In the example shown in FIG. 10D, access requests associated with port A are not pre-scheduled, but are rather scheduled at the same clock cycle when they are executed. For example, A11 and A22 are scheduled at time slots 1 and 2, respectively, not at time slot 0.

Figure 12A:
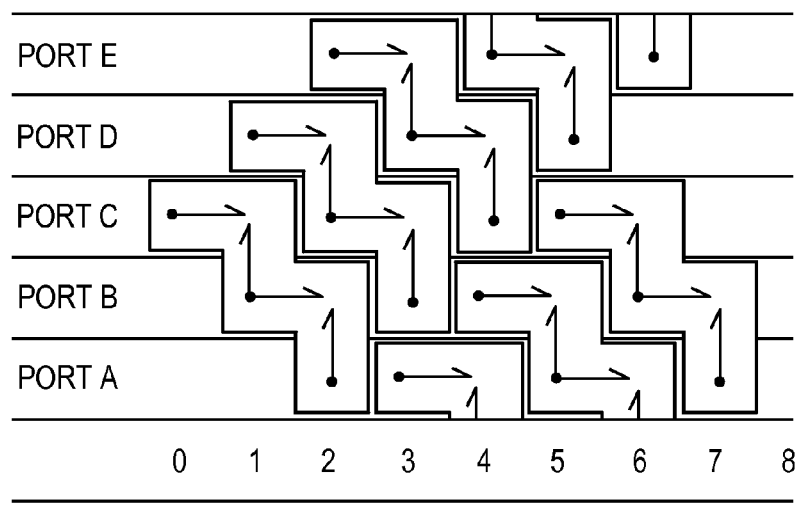
FIGS. 12A-12B show graphical representations of different approaches of scheduling access requests with more than four access requests being scheduled per clock cycle.
Figure 12B:
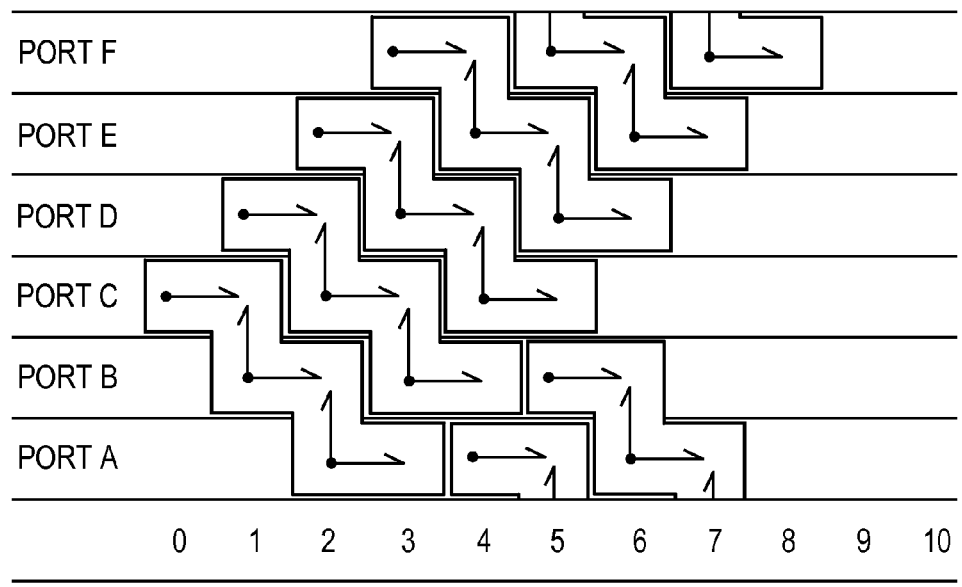

The different scheduling approaches described in FIGS. 10A-10D are provided for illustration purposes. A skilled person in the art should appreciate that other possible scheduling approaches may be employed. For example FIGS. 11A and 11B show example embodiments of scheduling two access requests at each clock cycle. FIGS. 11C and 11D show other example embodiments of scheduling three access requests per clock cycle. Also, FIGS. 12A-12B show example embodiments of scheduling more than four access requests per clock cycle.

A person skilled in the art should appreciate that the RCDS 410, shown in FIG. 4, may be arranged according to another example of nested data structures. As such the processing engines 510 are defined in accordance with respective fetched data structures. For example, if the nested data structures include a table, a processing engine may defined as, for example, table fetching engine or table walk engine. Processing engines 510, according to at least one example, refer to separate hardware processors such as single-core processors or specialized processors included in the XBC 530. Alternatively, processing engines 510 may be functions performed by one or more hardware processors included in the XBC 530.

Embodiments may be implemented in hardware, firmware, software, or any combination thereof. It should be understood that the block diagrams may include more or fewer elements, be arranged differently, or be represented differently. It should be understood that implementation may dictate the block and flow diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method of enabling multi-access to a plurality of physical memory banks, the method comprising:
    selecting a subset of multiple access requests to be executed in at least one clock cycle over at least one of a number of access ports connected to the plurality of physical memory banks, the selected subset of access requests addressed to different physical memory banks, among the plurality of memory banks, each access port coupled to one or more of the plurality of memory banks, each memory bank accessible by a single access port per clock cycle and each access port accessing a single memory; and
    scheduling the selected subset of access requests, each over a separate access port; wherein each access request includes a memory address with a first set of bits indicative of a physical memory bank, among the plurality of physical memory banks, and a second set of bits indicative of a memory row within the physical memory bank indicated by the first set of bits.

2. The method as in claim 1 further comprising executing the scheduled subset of access requests.

3. The method as in claim 2, wherein executing the scheduled subset of access requests includes pushing the scheduled subset of access requests to the different physical memory banks.

4. The method as in claim 1, wherein each of the multiple access requests is of a type among multiple types.

5. The method as in claim 4, wherein the multiple types include host data access type, tree data access type, bucket data access type, and rule data chunk access type.

6. The method as in claim 5, wherein an access request of the tree data access type is executable in a single clock cycle, an access request of the bucket data access type is executable in a single clock cycle, an access request of the rule data chunk access type is executable in one or more clock cycles, and an access request of the host data access type is executable in one or more clock cycles.

7. The method as in claim 5, wherein selecting the subset of access requests includes avoiding selecting a new rule data chunk access while another rule data chunk access is still being executed.

8. The method as in claim 5, wherein at least one of the access requests is a remote access request of any one of the tree data access type, the bucket data access type, and the rule data chunk access type.

9. The method as in claim 4, wherein selecting the subset of access requests includes prioritizing an access request based at least in part on a respective access type.

10. The method as in claim 1 further comprising:
    receiving the multiple access requests from one or more processors; and
    buffering the multiple access requests received into a plurality of memory buffers.

11. The method as in claim 1, wherein selecting the subset of access requests includes prioritizing an access request based at least in part on respective priority information.

12. The method as in claim 1, wherein selecting the subset of access requests includes prioritizing an access request based at least in part on respective latency information, said respective latency information being indicative of a waiting time associated with the access request or a respective memory buffer.

13. The method as in claim 1, wherein the selected subset of access requests is equal in number to the number of access ports.

14. The method as in claim 1, wherein scheduling the selected subset of access requests includes scheduling the selected subset of access requests to be executed in a single clock cycle.

15. The method as in claim 1, wherein scheduling the selected subset of access requests includes scheduling the selected subset of access requests to be executed over a single access port of the number of access ports and in a number of clock cycles less than or equal to the number of access ports, the number of access ports being greater than one.

16. The method as in claim 1, wherein scheduling the selected subset of access requests includes scheduling the selected subset of access requests to be executed over two or more access ports and in a number of clock cycles less than or equal to the number of access ports minus one.

17. The method as in claim 1, wherein the selected subset of access requests is less than or equal in number to the number of access ports.

18. The method as in claim 1, wherein the selected subset of access requests is greater in number than the number of access ports.

19. An apparatus of enabling multi-access to a plurality of physical memory banks, the apparatus comprising:
    at least one memory buffer configured to store multiple access requests received from one or more processors; and
    a scheduling module configured to:
    select a subset of the multiple access requests to be executed in at least one clock cycle over at least one of a number of access ports connected to the plurality of physical memory banks, the selected subset of access requests addressed to different physical memory banks, among the plurality of memory banks, each access port coupled to one or more of the plurality of memory banks, each memory bank accessible by a single access port per clock cycle and each access port accessing a single memory bank per cycle; and
    schedule the selected subset of access requests, each over a separate access port;
    wherein each access request includes a memory address with a first set of bits indicative of a physical memory bank, among the plurality of physical memory banks, and a second set of bits indicative of a memory row within the physical memory bank indicated by the first set of bits.

20. The apparatus as in claim 19 further comprising a communication interface coupling the apparatus to the plurality of physical memory banks, the communication interface is configured to execute the scheduled subset of access requests.

21. The apparatus as in claim 20, wherein in executing the scheduled subset of access requests, the communication interface is configured to push the scheduled subset of access requests to the different physical memory banks.

22. The apparatus as in claim 19, wherein each of the multiple access requests is of a type among multiple types.

23. The apparatus as in claim 22, wherein the multiple types include host data access type, tree data access type, bucket data access type, and rule data chunk access type.

24. The apparatus as in claim 23, wherein an access request of the tree data access type is executable in a single clock cycle, an access request of the bucket data access type is executable in a single clock cycle, an access request of the rule data chunk access type is executable in one or more clock cycles, and an access request of the host data access type is executable in one or more clock cycles.

25. The apparatus as in claim 23, wherein in selecting the subset of access requests the scheduling module is configured to avoid selecting a new rule data chunk access while another rule data chunk access is still being executed.

26. The apparatus as in claim 23, wherein at least one of the access requests is a remote access request of any one of the tree data access type, the bucket data access type, and the rule data chunk access type.

27. The apparatus as in claim 22, wherein in selecting the subset of access requests the scheduling module is configured to prioritize an access request based at least in part on a respective access type.

28. The apparatus as in claim 19, wherein the at least one memory buffer includes multiple memory buffers, each memory buffer is configured to store access requests of the same type.

29. The apparatus as in claim 19, wherein in selecting the subset of access requests the scheduling module is configured to prioritize an access request based at least in part on respective priority information.

30. The apparatus as in claim 19, wherein in selecting the subset of access requests the scheduling module is configured to prioritize an access request based at least in part on respective latency information, said respective latency information being indicative of a waiting time associated with the access request or a respective memory buffer.

31. The apparatus as in claim 19, wherein the selected subset of access requests is equal in number to the number of access ports.

32. The apparatus as in claim 19, wherein in scheduling the selected subset of access requests the scheduling module is configured to schedule the selected subset of access requests to be executed in a single clock cycle.

33. The apparatus as in claim 19, wherein in scheduling the selected subset of access requests the scheduling module is configured to schedule the selected subset of access requests to be executed over a single access port of the number of access ports and in a number of clock cycles less than or equal to the number of access ports, the number of access ports being greater than one.

34. The apparatus as in claim 19, wherein in scheduling the selected subset of access requests the scheduling module is configured to schedule the selected subset of access requests to be executed over two or more access ports and in a number of clock cycles less than or equal to the number of access ports minus one.

35. The apparatus as in claim 19, wherein the selected subset of access requests is less than or equal in number to the number of access ports.

36. The apparatus as in claim 19, wherein the selected subset of access requests is greater in number than the number of access ports.

* * * * *

UNITED STATES PATENT AND TRADEMARK OFFICE
CERTIFICATE OF CORRECTION

PATENT NO. : 9,065,860 B2  
APPLICATION NO. : 13/565735  
DATED : June 23, 2015  
INVENTOR(S) : Jeffrey A. Pangborn et al.

Page 1 of 1

It is certified that error appears in the above-identified patent and that said Letters Patent is hereby corrected as shown below:

In the claims

In Column 19, Claim 1, line 38, delete "memory;" and insert -- memory bank per cycle; --.

Signed and Sealed this
Fifteenth Day of December, 2015

Michelle K. Lee
*Director of the United States Patent and Trademark Office*